United States Patent
Kim et al.

(10) Patent No.: US 12,538,370 B2
(45) Date of Patent: Jan. 27, 2026

(54) MULTI-LINK DEVICE OPERATING IN MULTIPLE LINKS AND METHOD FOR OPERATING MULTI-LINK DEVICE

(71) Applicant: WILUS INSTITUTE OF STANDARDS AND TECHNOLOGY INC., Gyeonggi-do (KR)

(72) Inventors: Sanghyun Kim, Gyeonggi-do (KR); Geonjung Ko, Gyeonggi-do (KR); Juhyung Son, Gyeonggi-do (KR); Jinsam Kwak, Gyeonggi-do (KR)

(73) Assignee: WILUS INSTITUTE OF STANDARDS AND TECHNOLOGY INC., Gyeonggi-do (KR)

( * ) Notice: Subject to any disclaimer, the term of this patent is extended or adjusted under 35 U.S.C. 154(b) by 73 days.

(21) Appl. No.: 18/369,193

(22) Filed: Sep. 17, 2023

(65) Prior Publication Data
US 2024/0008119 A1 Jan. 4, 2024

Related U.S. Application Data

(63) Continuation of application No. PCT/KR2022/003704, filed on Mar. 16, 2022.

(30) Foreign Application Priority Data

| Mar. 17, 2021 | (KR) | 10-2021-0034964 |
| Mar. 19, 2021 | (KR) | 10-2021-0036273 |
| Mar. 24, 2021 | (KR) | 10-2021-0038379 |

(51) Int. Cl.
*H04W 84/12* (2009.01)
*H04W 52/02* (2009.01)
(Continued)

(52) U.S. Cl.
CPC ....... *H04W 76/15* (2018.02); *H04W 52/0216* (2013.01); *H04W 76/34* (2018.02); *H04W 84/12* (2013.01)

(58) Field of Classification Search
CPC . H04W 52/0216; H04W 84/12; H04W 76/15; H04W 76/34
See application file for complete search history.

(56) References Cited

U.S. PATENT DOCUMENTS

| 2019/0246354 A1* | 8/2019 | Huang | H04W 52/0229 |
| 2019/0268846 A1* | 8/2019 | Xiao | H04W 52/0229 |

(Continued)

FOREIGN PATENT DOCUMENTS

| CN | 116546442 | 8/2023 |
| WO | 2021/004382 | 1/2021 |

(Continued)

OTHER PUBLICATIONS

International Search Report for PCT/KR2022/003704 mailed on Jul. 12, 2022 and its English translation from WIPO (now published as WO 2022/197105).

(Continued)

*Primary Examiner* — Kevin T Bates
*Assistant Examiner* — Yonghong Zhao
(74) *Attorney, Agent, or Firm* — EIP US LLP

(57) ABSTRACT

Disclosed is a multi-link device comprising multiple stations operating in multiple links, respectively. The multi-link operation device comprises: a transceiver; and a processor. The processor transmits a target wake time (TWT) element from a first station which is one of the multiple stations and is coupled to a first AP in a first link, so as to request a TWT agreement with a second station operating in a second link, for a second AP coupled to the second station.

12 Claims, 21 Drawing Sheets

(51) Int. Cl.
*H04W 76/15* (2018.01)
*H04W 76/28* (2018.01)
*H04W 76/30* (2018.01)
*H04W 76/34* (2018.01)

(56) References Cited

U.S. PATENT DOCUMENTS

2022/0132610 A1* 4/2022 Guo ............... H04W 76/11
2022/0272630 A1* 8/2022 Shafin ............ H04W 52/0219

FOREIGN PATENT DOCUMENTS

WO    WO-2021004382 A1 *  1/2021    ............ H04L 1/16
WO       2022/197105           9/2022

OTHER PUBLICATIONS

Written Opinion of the International Searching Authority for PCT/KR2022/003704 mailed on Jul. 12, 2022 and its English translation from Google Translate (now published as WO 2022/197105).
Gan, Ming et al. Proposed Draft Text for TWT for MLD. Doc.: IEEE 802.11-21/0080r4. Mar. 15, 2021.
Shafin, Rubayet et al. MLO: Broadcast TWT for MLDs. Doc.: IEEE 802.11-21/0394r0. Mar. 7, 2021.
Asterjadhi, Alfred et al. Comment resolutions for miscellaneous TWT. Doc.: IEEE 802.11-19/0561r02. Jun. 13, 2019.
Gan, Ming et al. TWT for MLD. Doc.: IEEE 802.11-20/1680-00-00be. Oct. 20, 2020.
Gan, Ming et al. Proposed Draft Text for TWT for MLD. Doc.: IEEE 802.11-21/0080r0. Jan. 4, 2021.
Office Action dated Aug. 5, 2024 for Japanese Patent Application No. 2023-557401 and its English translation provided by Applicant's foreign counsel.
Alfred Asterjadhi et al.: "Comment resolutions for miscellaneous CIDs in clause 10", doc.: IEEE 802.11-20/0349r1, Mar. 21, 2020, pp. 1-11.
Extended European Search Report dated Aug. 28, 2024 for European Patent Application No. 22771771.7.
Yongho Seok (MediaTek Inc.) et al.: "Eht Sst Operation", doc.: IEEE 802.11-20/0736r0, Jul. 13, 2020, slides 1-19.
Office Action issued in Korean Application No. 10-2023-7031011, dated Sep. 29, 2025, 16 pgs.

* cited by examiner (a) EHT SU PPDU: L-STF | L-LTF | L-SIG | RL-SIG | U-SIG | EHT-SIG-A | EHT-STF | EHT-LTF | SVC | MPDU | TAIL (b) EHT TB PPDU: L-STF | L-LTF | L-SIG | RL-SIG | U-SIG | EHT-STF | EHT-LTF | SVC | MPDU | TAIL (c) EHT MU PPDU: L-STF | L-LTF | L-SIG | RL-SIG | U-SIG | EHT-SIG-B | EHT-STF | EHT-LTF | SVC | MPDU | TAIL (d) EHT ER SU PPDU: L-STF | L-LTF | L-SIG | RL-SIG | U-SIG | EHT-SIG-A | EHT-STF | EHT-LTF | SVC | MPDU | TAIL

FIG. 8

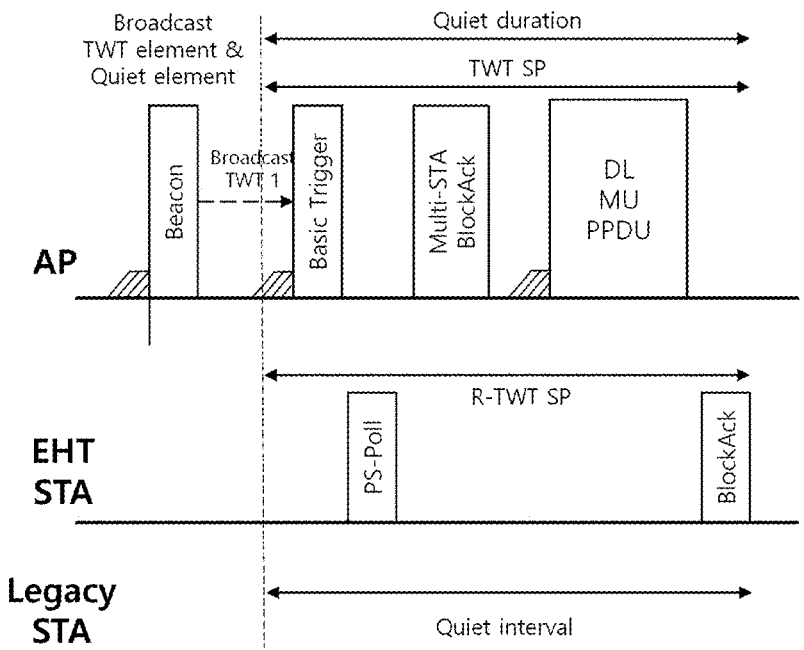
(a) R-TWT SP == Quiet duration
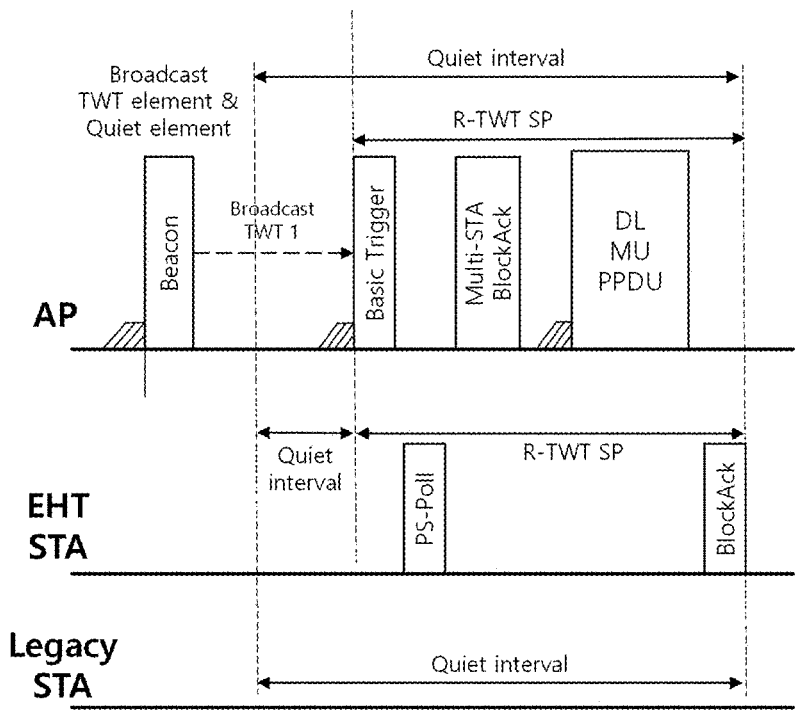
(b) R-TWT SP < Quiet duration
FIG. 12

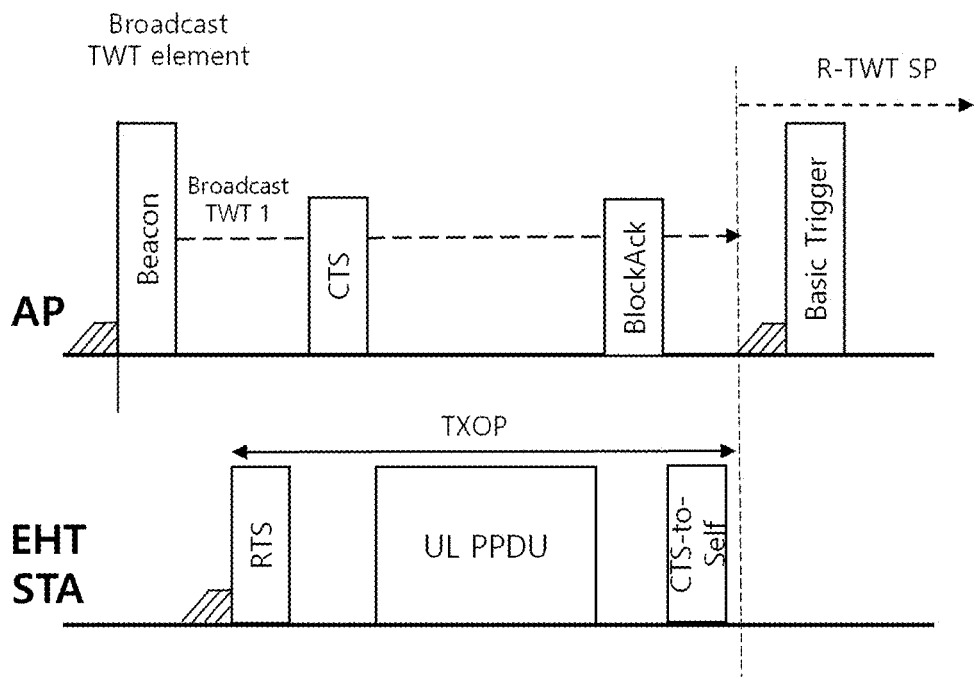
(a) Short TXOP
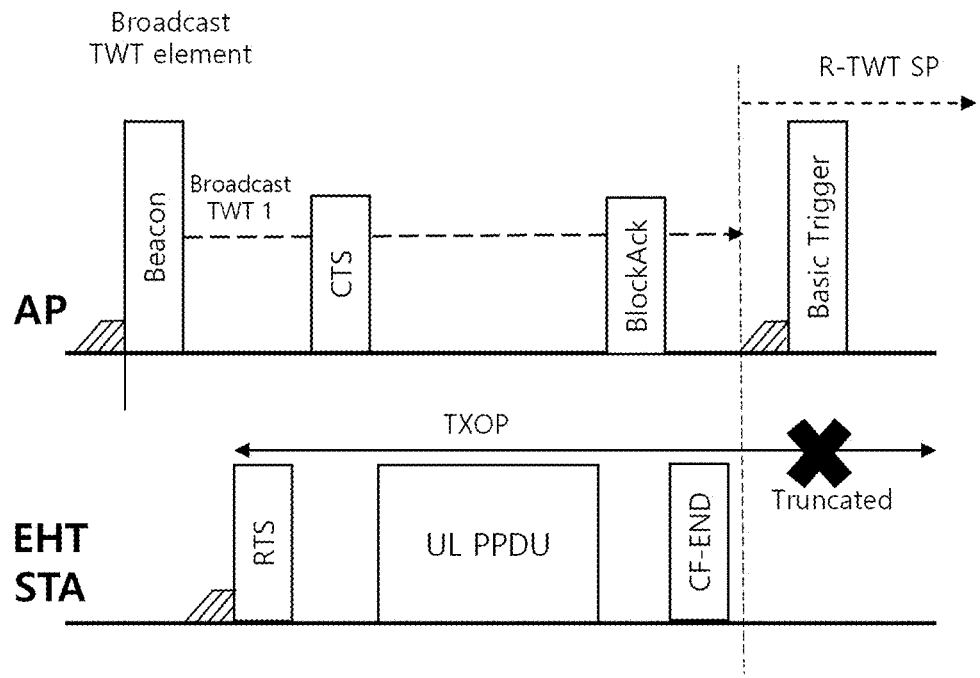
(b) TXOP truncation
FIG. 13

R-TWT SP termination(truncation)

| Element ID | Length | Control | TWT Parameter Information |
|---|---|---|---|

(a) TWT element format

| NDP Paging Indicator | Responder PM Mode | Negotiation Type | TWT Information Frame Disabled | Wake Duration Unit | Link ID Bitmap Present | Reserved |
|---|---|---|---|---|---|---|

(b) Control field format (TWT element)

| Request Type | Target Wake Time | TWT Group Assignment | Nominal Minimum TWT Wake Duration | TWT Wake Interval Mantissa | TWT Channel | NDP Paging (optional) | Link ID Bitmap |
|---|---|---|---|---|---|---|---|

(c) Individual TWT Parameter Set field format

| TWT Request | TWT Setup Command | Trigger | Implicit | Flow Type | TWT Flow Identifier | TWT Wake interval Exponent | TWT Protection |
|---|---|---|---|---|---|---|---|

(d) Request Type field format in an Individual TWT Parameter Set field

*FIG. 16*

| Request Type | Target Wake Time | TWT Group Assignment | Nominal Minimum TWT Wake Duration | TWT Wake Interval Mantissa | TWT Channel | NDP Paging (optional) | Link ID Bitmap | Additional TWT Flow ID field |
|---|---|---|---|---|---|---|---|---|
| 2 | 0 or 8 | 0, 3 or 9 | 1 | 2 | 1 | 0 or 4 | 0 or 2 | Variable |

Additional TWT Flow Identifier fields in the
Individual TWT Parameter Set field format

*FIG. 20*

| TWT Flow ID subfield#1 | Reserved | TWT Flow ID subfield#2 | Reserved |
|---|---|---|---|

Bits:  3  1  3  1

(a) Per-octet format

| TWT Flow ID field | Reserved |
|---|---|

Bits:  3  5

(b) Last-octet only format

*FIG. 21*

| NDP Paging Indicator | Responder PM Mode | Negotiation Type | TWT Information Frame Disabled | Wake Duration Unit | Link ID Bitmap Present | Additional TWT Flow ID Present |
|---|---|---|---|---|---|---|
| Bits: 1 | 1 | 2 | 1 | 1 | 1 | 1 |

(MLD) Control field format (TWT element)

FIG. 22

| Value | Meaning | Time Priority |
|---|---|---|
| 0 | AID Switch Request | No |
| 1 | AID Switch Response | No |
| 2 | Sync Control | No |
| 3 | Sync Information Announcement | No |
| 4 | EDCA Parameter Set | No |
| 5 | EL Operation | No |
| 6 | TWT Setup | No |
| 7 | TWT Teardown | No |
| 8 | Sectorized Group ID List | No |
| 9 | Sector ID Feedback | No |
| 10 | Reserved | |
| 11 | TWT Information | No |
| 12 | MLD TWT Teardown | No |
| 13-255 | Reserved | |

(a) Unprotected S1G Action field values

| Order | Information |
|---|---|
| 1 | Category (=22 (Unprotected S1G)) |
| 2 | Unprotected S1G Action (=12) |
| 3 | MLD TWT Flow |

(b) MLD TWT Teardown frame Action field format

*FIG. 23*

| MLD TWT Flow Control | MLD TWT Flow IDs |
|---|---|

Octets:      1                                 0 or m (a) MLD TWT Flow field format

| Length of MLD Flow IDs field =m | Teardown All TWT of All Link |
|---|---|
| 6/7 bit | 1 bit |

(b) MLD TWT Flow Control field format

| Reserved | Teardown All TWT of All Link==1 |
|---|---|
| 7 bit | 1 bit |

(c) MLD TWT Flow Control field format (Teardown All TWT of All Link ==1)

| TWT Flow Identifier | Link ID | Teardown All TWT | |
|---|---|---|---|
| 3 bit | 4 bit | 1 bit | x m |

(d) MLD TWT Flow IDs field format (per-octet)

| Reserved | Link ID | Teardown All TWT (on a Link) ==1 |
|---|---|---|
| 3 bit | 4 bit | 1 bit |

(e) MLD TWT Flow IDs field format of an octet with Teardown All TWT ==1

| TWT Flow Identifier | Reserved | Teardown All TWT (of a TWT Flow ID) ==1 |
|---|---|---|
| 3 bit | 4 bit | 1 bit |

(f) MLD TWT Flow IDs field format of an octet with Teardown All TWT ==1

*FIG. 24*

| MLD TWT Flow Control | MLD TWT Bitmap |
|---|---|

Octets: 1      0 or 3 x m (a) MLD TWT Flow field format

| Type | Length of Bitmap =m | Reserved | Teardown All TWT of All Link |
|---|---|---|---|

1 bit    3 bit    3 bit    1 bit (b) MLD TWT Flow Control field format

| Reserved | Teardown All TWT of All Link==1 |
|---|---|

7 bit      1 bit (c) MLD TWT Flow Control field format
(Teardown All TWT of All Link ==1)

| TWT Flow ID Bitmap | Link ID Bitmap |
|---|---|

Octets:    1        2

(d) MLD TWT Bitmap field format #1
(per 3-octet)

| TWT Flow ID (3-bit) | Reserved (5-bit) | Link ID Bitmap (16-bit) |
|---|---|---|

Octets:       1        2

(e) MLD TWT Bitmap field format #2
(per 3-octet)

*FIG. 25*

| | B0 | | | B3 | B4 | B5 | B6 | B7 |
|---|---|---|---|---|---|---|---|---|
| (a) All TWT Of that Link | Reserved | | | | Teardown Type = 0 | Negotiation type = 0 or 1 | | Teardown all TWT = 1 |

| | B0 | | | B3 | B4 | B5 | B6 | B7 |
|---|---|---|---|---|---|---|---|---|
| (b) All TWT A Link | Link ID (4-bit) | | | | Teardown Type = 1 | Negotiation type = 0 or 1 | | Teardown all TWT = 0 |

| | B0 | B2 | B3 | | B4 | B5 | B6 | B7 |
|---|---|---|---|---|---|---|---|---|
| (c) A TWT All Link | TWT Flow ID (3-bit) | | All Link = 1 | | Teardown Type = 0 | Negotiation type = 0 or 1 | | Teardown all TWT = 0 |

| | B0 | | | B3 | B4 | B5 | B6 | B7 |
|---|---|---|---|---|---|---|---|---|
| (d) ALL TWT ALL Link | Reserved | | | | Teardown Type = 1 | Negotiation type = 0 or 1 | | Teardown all TWT = 1 |

TWT Flow field format if the Negotiation Type subfield is 0 or 1

*FIG. 26*

MULTI-LINK DEVICE OPERATING IN MULTIPLE LINKS AND METHOD FOR OPERATING MULTI-LINK DEVICE

TECHNICAL FIELD

The disclosure relates to a multi-link device operating in multiple links and a method for operating a multi-link device.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

As a wireless LAN standard after 802.11ac and 802.11ad, the IEEE 802.11ax (high efficiency WLAN, HEW) standard for providing a high-efficiency and high-performance wireless LAN communication technology in a high-density environment, in which APs and terminals are concentrated, is in the development completion stage. In an 802.11ax-based wireless LAN environment, communication with high frequency efficiency should be provided indoors/outdoors in the presence of high-density stations and access points (APs), and various technologies have been developed to implement the same.

In order to support new multimedia applications, such as high-definition video and real-time games, the development of a new wireless LAN standard has begun to increase a maximum transmission rate. In IEEE 802.11be (extremely high throughput, EHT), which is a 7th generation wireless LAN standard, development of standards is underway aiming at supporting a transmission rate of up to 30 Gbps via a wider bandwidth, an increased spatial stream, multi-AP cooperation, and the like in a 2.4/5/6 GHz band.

DISCLOSURE OF INVENTION

Technical Problem

An embodiment of the disclosure is to provide a wireless communication method using multiple links and a wireless communication terminal using same.

Solution to Problem

A multi-link device including multiple stations operating in each of multiple links according to an embodiment of the disclosure includes a transceiver and a processor. The processor transmits a target wake time (TWT) element from a first station which is one of the multiple stations and is associated to a first AP in a first link, so as to request a TWT agreement for a second station operating in a second link, and a second AP associated to the second station.

The TWT element may include a bitmap indicating information indicating a link to which a TWT agreement to be established by the TWT element is to be applied.

A TWT request station of the TWT agreement for the second station and the second AP may be the second station, and a TWT response station of the TWT agreement for the second station and the second AP may be the second AP.

When receiving the TWT teardown frame from the second AP or transmitting the TWT teardown frame to the second AP successfully, the processor may tear down the TWT agreement for the second station and the second AP.

In case that the second link is disabled, the processor may tear down the TWT agreement for the second station and the second AP without reception or transmission of the TWT teardown frame for tearing down the TWT agreement for the second station and the second AP.

The TWT element may request multiple TWT agreements established on multiple links including the second link.

Each of the multiple TWT agreements established on the multiple links may be identified based on a link ID of each of the multiple links.

Each of the multiple TWT agreements established on the multiple links may be identified based on a link ID of each of the multiple links, a medium access control (MAC) address of the multi-link device, and a TWT Flow ID of the multiple TWT agreements established on the multiple links.

When transmitting the TWT teardown frame successfully or receiving the TWT teardown frame, the processor may tear down at least one of the multiple TWT agreements established on the multiple links, based on a link ID indicated by the TWT teardown frame.

The processor may tear down the TWT agreement for the second station and the second AP and inherit the TWT agreement for the second station and the second AP to the first station and the first AP.

When inheriting the TWT agreement for the second station and the second AP to the first station and the first AP, the processor may apply a TWT parameter of the TWT agreement for the second station and the second AP to a TWT agreement for the first station and the first AP.

A method of operating a multi-link device including multiple stations operating in each of multiple links according to an embodiment of the disclosure may include an operation of transmitting a target wake time (TWT) element from a first station which is one of the multiple stations and is associated to a first AP in a first link, so as to request a TWT agreement for a second station operating in a second link, and a second AP associated to the second station.

The TWT element may include a bitmap indicating information indicating a link to which a TWT agreement to be established by the TWT element is to be applied.

A TWT request station of the TWT agreement for the second station and the second AP may be the second station, and a TWT response station of the TWT agreement for the second station and the second AP may be the second AP.

When receiving the TWT teardown frame from the second AP or transmitting the TWT teardown frame to the second AP successfully, the operating method may further include an operation of tearing down the TWT agreement for the second station and the second AP.

In case that the second link is disabled, the operating method may further include an operation of tearing down the TWT agreement for the second station and the second AP without reception or transmission of the TWT teardown frame for tearing down the TWT agreement for the second station and the second AP.

The TWT element may request multiple TWT agreements established on multiple links including the second link.

Each of the multiple TWT agreements established on the multiple links may be identified based on a link ID of each of the multiple links.

Each of the multiple TWT agreements established on the multiple links may be identified based on a link ID of each of the multiple links, a medium access control (MAC) address of the multi-link device, and a TWT Flow ID of the multiple TWT agreements established on the multiple links.

When transmitting the TWT teardown frame successfully or receiving the TWT teardown frame, the operating method may further include an operation of tearing down at least one of the multiple TWT agreements established on the multiple links, based on a link ID indicated by the TWT teardown frame.

Advantageous Effects of Invention

An embodiment of the disclosure provides a multi-link device operating in multiple links. Furthermore, an embodiment of the disclosure provides a method in which a multi-link device effectively performs a TWT operation.

BRIEF DESCRIPTION OF DRAWINGS

FIG. 8 illustrates an example of various extremely high throughput (EHT) physical protocol data unit (PPDU) formats and a method for indicating the same according to an embodiment of the present invention.

FIG. 12 illustrates an AP configuring a quiet interval according to an embodiment of the disclosure.

FIG. 13 illustrates a method in which a station configures a TXOP in consideration of a limited service period according to an embodiment of the disclosure.

FIG. 16 illustrates a format of a TWT element according to an embodiment of the disclosure.

FIG. 20 illustrates a format of an Individual TWT Parameter Set field of a TWT element according to an embodiment of the disclosure.

FIG. 21 illustrates formats of remaining TWT Flow Identifier subfields excluding a first TWT Flow Identifier subfield according to an embodiment of the disclosure.

FIG. 22 illustrates a format of a Control field included in a TWT element transmitted by a multi-link device according to an embodiment of the disclosure.

FIG. 23 illustrates a format of an Action field of a TWT teardown frame transmitted by a multi-link device according to an embodiment of the disclosure.

FIG. 24 illustrates an MLD TWT Flow field according to an embodiment of the disclosure.

FIG. 25 illustrates a format of an MLD TWT Flow field according to another embodiment of the disclosure.

FIG. 26 illustrates a TWT teardown frame for tearing down a TWT agreement established in a multi-link device according to an embodiment of the disclosure.

BEST MODE FOR CARRYING OUT THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

Hereinafter, in the present invention, a field and a subfield may be interchangeably used.

Figure 1:
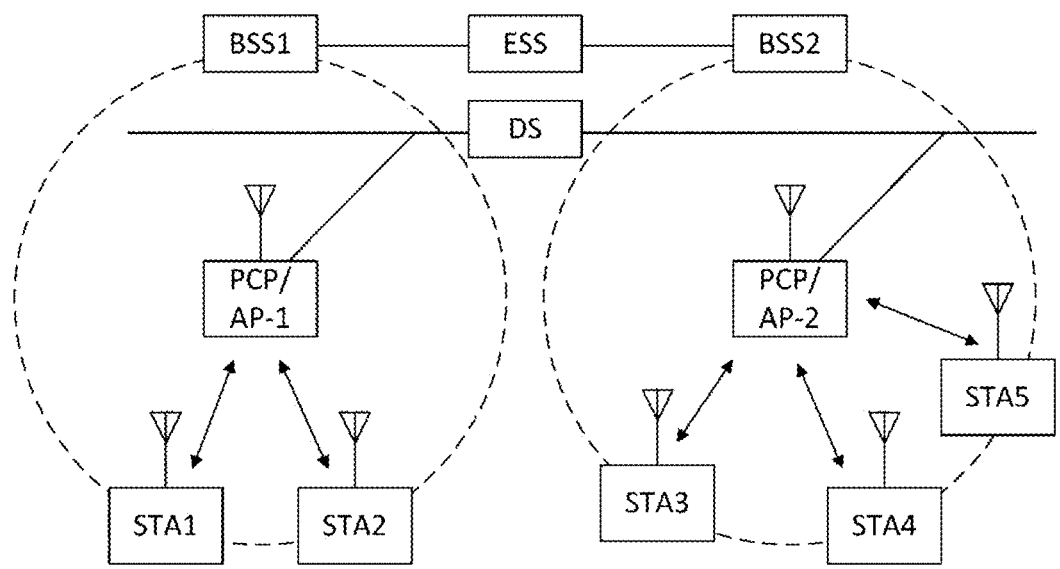
FIG. 1 illustrates a wireless LAN system according to an embodiment of the present invention.

FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points AP-1 and AP-2 which are stations providing a distribution service, and a distribution system (DS) connecting the multiple access points AP-1 and AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
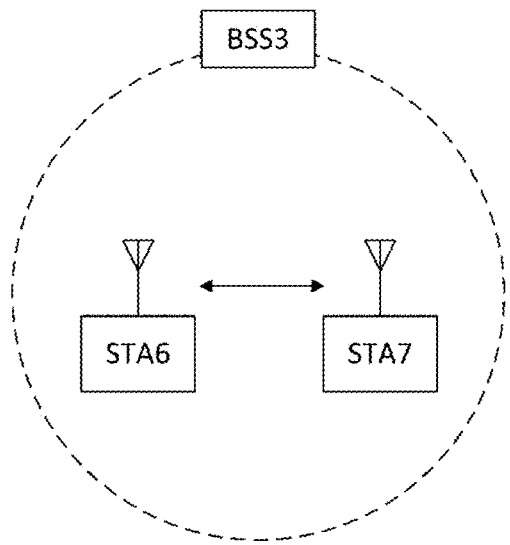
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STA7 are not connected with the AP. The independent BSS is not permitted to access the distribution system and forms a self-contained network. In the independent BSS, the respective stations STA6 and STA7 may be directly connected with each other.

Figure 3:
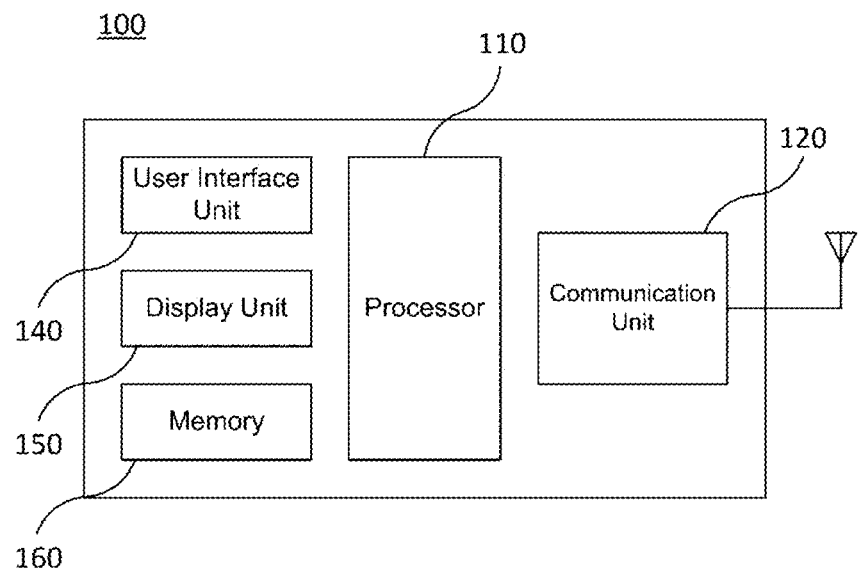
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, 6 GHz and 60 GHz. According to an embodiment, the station 100 may include a communication module using a frequency band of 7.125 GHz or more and a communication module using a frequency band of 7.125 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
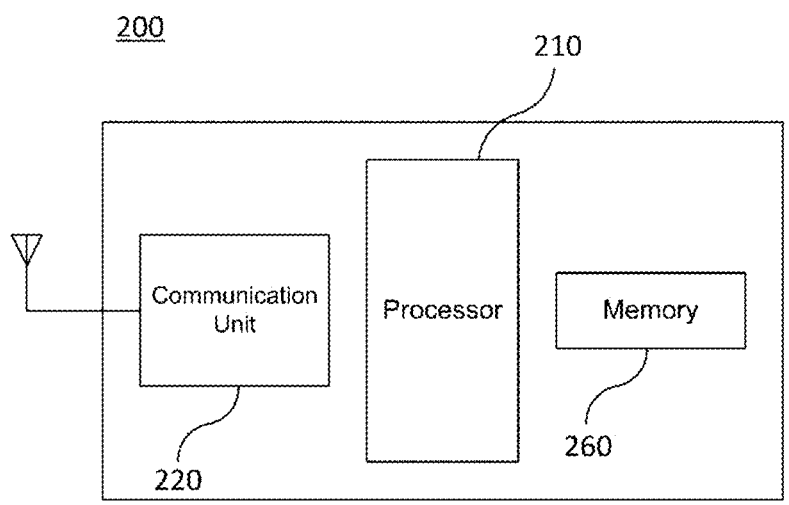
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, 6 GHz and 60 GHz together. Preferably, the AP 200 may include a communication module using a frequency band of 7.125 GHz or more and a communication module using a frequency band of 7.125 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
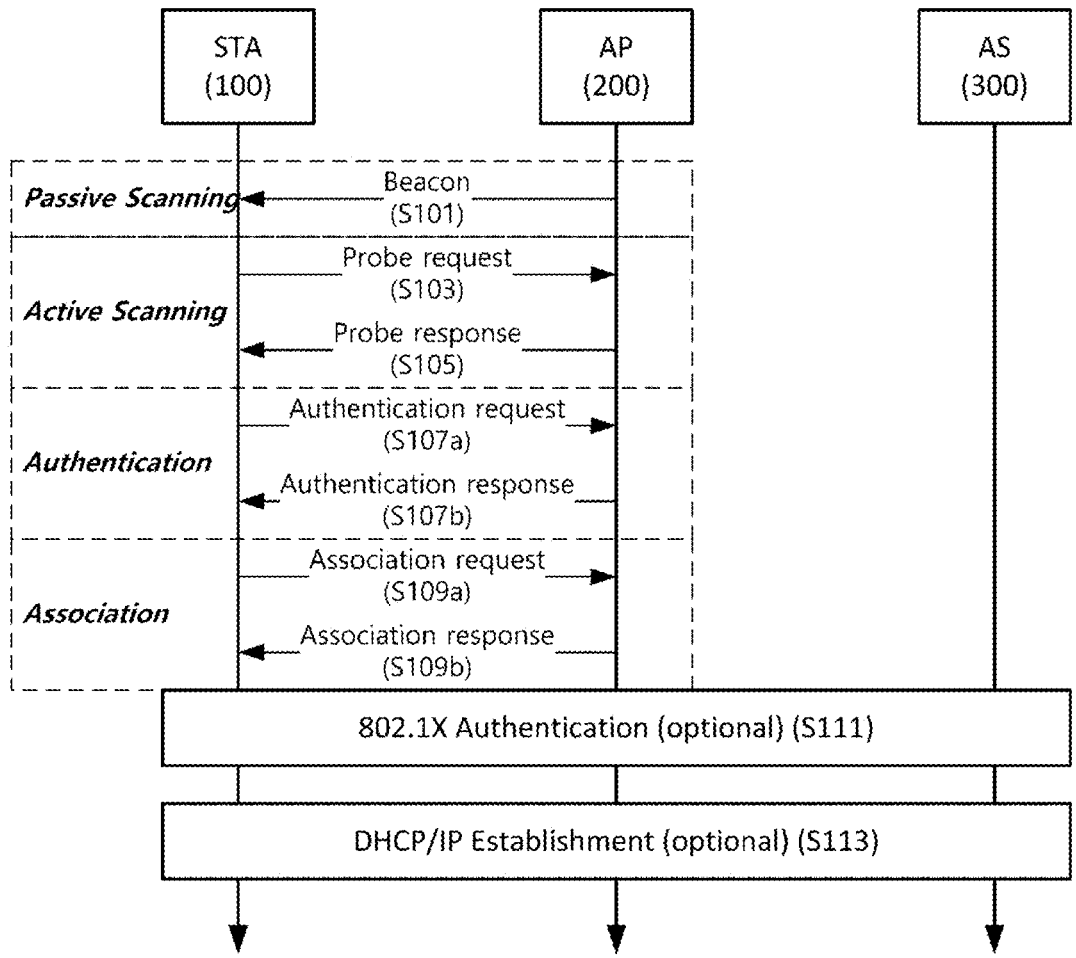
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
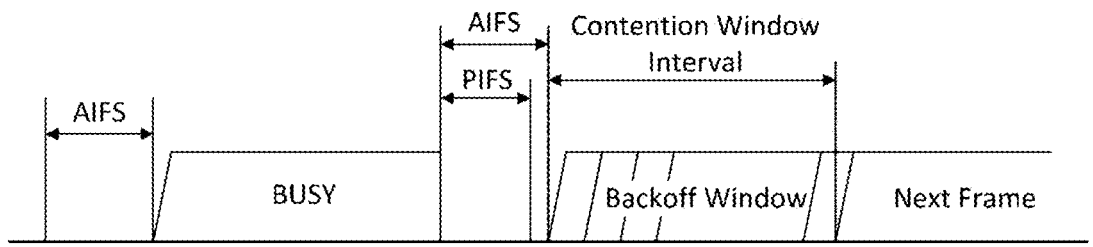
FIG. 6 illustrates a carrier sense multiple access (CSMA)/ collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval. In this instance, a random number is referred to as a backoff counter. That is, the initial value of the backoff counter may be set by an integer number which is a random number that a UE obtains. In the case that the UE detects that a channel is idle during a slot time, the UE may decrease the backoff counter by 1. In addition, in the case that the backoff counter reaches 0, the UE may be allowed to perform channel access in a corresponding channel. Therefore, in the case that a channel is idle during an AIFS time and the slot time of the backoff counter, transmission by the UE may be allowed.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Examples of Various PPDU Formats

Figure 7:
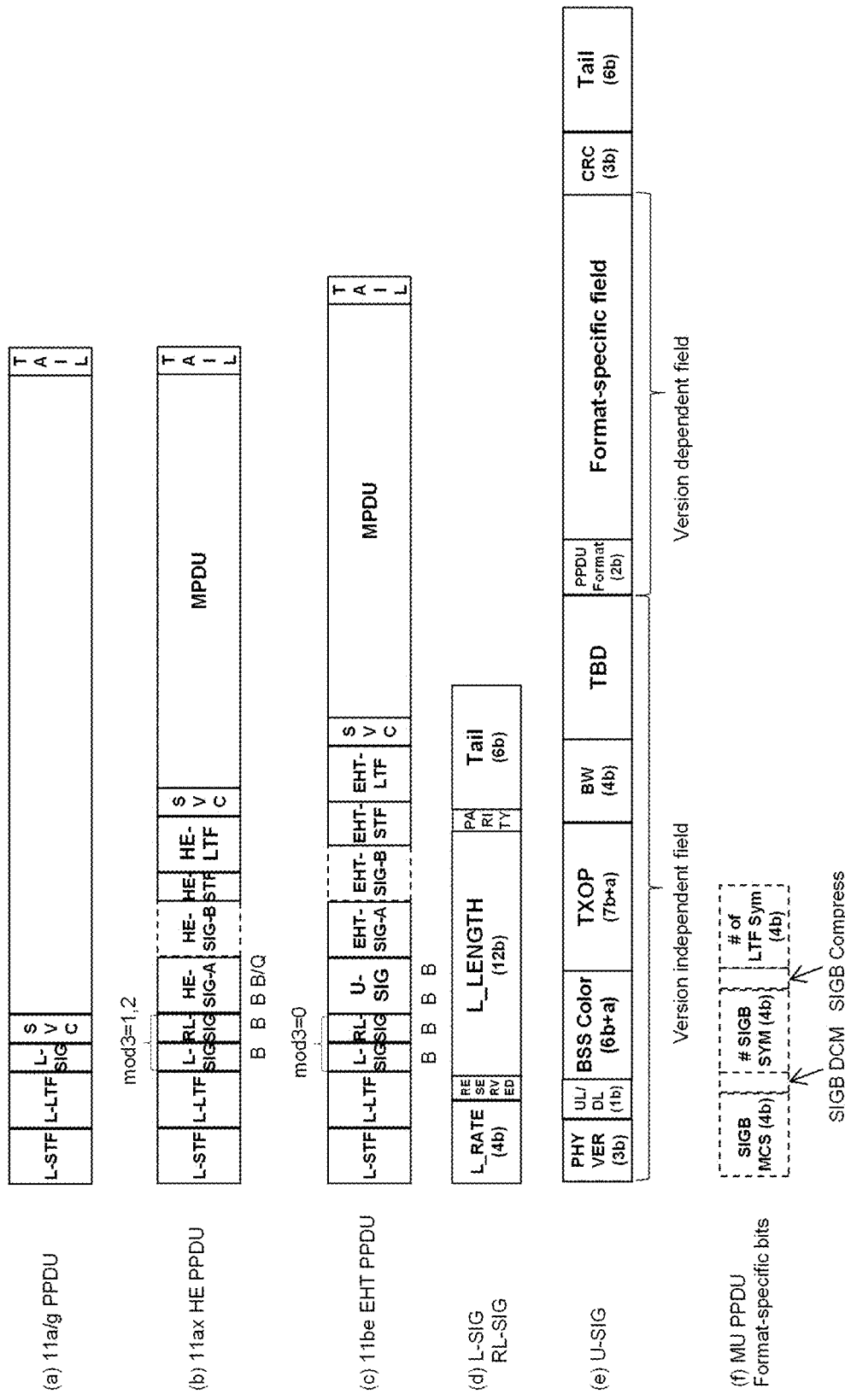
FIG. 7 illustrates an example of a format of a PLCP Protocol data unit (PPDU) for each of various standard generations.

FIG. 7 illustrates an example of a format of a PLCP Protocol data unit (PPDU) for each of various standard generations. More specifically, FIG. 7(a) illustrates an embodiment of a legacy PPDU format based on 802.11a/g, FIG. 7(b) illustrates an embodiment of an HE PPDU format based on 802.11ax, and FIG. 7(c) illustrates an embodiment of a non-legacy PPDU (i.e., EHT PPDU) format based on 802.11be. FIG. 7(d) illustrates detailed field configurations of RL-SIG and L-SIG commonly used in the PPDU formats.

Referring to FIG. 7(a), a preamble of the legacy PPDU includes a legacy short training field (L-STF), a legacy long training field (L-LTF), and a legacy signal field (L-SIG). In an embodiment of the present invention, the L-STF, the L-LTF, and the L-SIG may be referred to as a legacy preamble.

Referring to FIG. 7(b), a preamble of the HE PPDU additionally includes, in the legacy preamble, a repeated legacy short training field (RL-SIG), a high efficiency signal A field (HE-SIG-A), a high efficiency signal B field (HE-SIG-B), a high efficiency short training field (HE-STF), and a high efficiency long training field (HE-LTF). In an embodiment of the present invention, the RL-SIG, HE-SIG-A, the HE-SIG-B, the HE-STF and the HE-LTF may be referred to as an HE preamble. A specific configuration of the HE preamble may be modified according to an HE PPDU format. For example, HE-SIG-B may be used only in an HE MU PPDU format.

Referring to FIG. 7(c), a preamble of the EHT PPDU additionally includes, in the legacy preamble, a repeated legacy short training field (RL-SIG), a universal signal field (U-SIG), and an extremely high throughput signal A field (EHT-SIG-A), an extremely high throughput signal B field (EHT-SIG-B), an extremely high throughput short training field (EHT-STF), and an extremely high throughput long training field (EHT-LTF). In an embodiment of the present invention, the RL-SIG, EHT-SIG-A, the EHT-SIG-B, the EHT-STF and the EHT-LTF may be referred to as an EHT preamble. A specific configuration of a non-legacy preamble may be modified according to an EHT PPDU format. For example, EHT-SIG-A and EHT-SIG-B may be used only in a part of the EHT PPDU format.

64-FFT OFDM is applied in an L-SIG field included in the preamble of the PPDU, and the L-SIG field includes a total of 64 subcarriers. Among 64 subcarriers, 48 subcarriers excluding a guard subcarrier, a DC subcarrier, and a pilot subcarrier are used for transmission of L-SIG data. BPSK and a modulation and coding scheme (MCS) of rate=1/2 are applied in L-SIG, and therefore the L-SIG may include a total of 24 bits of information. FIG. 7(d) illustrates a 24-bit information configuration of L-SIG.

Referring to FIG. 7(d), the L-SIG includes an L_RATE field and an L_LENGTH field. The L_RATE field includes 4 bits and indicates an MCS used for data transmission. Specifically, the L_RATE field indicates one value among transmission rates of 6/9/12/18/24/36/48/54 Mbps obtained by combining a modulation scheme of BPSK/QPSK/16-QAM/64-QAM, etc. and an inefficiency of 1/2, 2/3, 3/4, etc. A total length of a corresponding PPDU may be indicated by combining information of the L_RATE field and information of the L_LENGTH field. In a non-legacy PPDU format, the L_RATE field is configured to a minimum rate of 6 Mbps.

A unit of the L_LENGTH field is a byte and a total of 12 bits are allocated to signal up to 4095, and a length of the PPDU may be indicated in combination with the L_RATE field. A legacy terminal and a non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(us) = \left(\left\lceil \frac{L\_LENGTH + 3}{3} \right\rceil\right) \times 4 + 20 \quad \text{[Equation 1]}$$

In this case, denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(byte) = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

TXTIME (us)=$T_{L\text{-}STF}+T_{L\text{-}LTF}+T_{L\text{-}SIG}+T_{RL\text{-}SIG}+$
$T_{U\text{-}SIG}+(T_{EMT\text{-}SIG\text{-}A})+(T_{EHT\text{-}SIG\text{-}A})+T_{EHT\text{-}STF}+$
$N_{EHT\text{-}LTF}\cdot T_{EHT\text{-}LTF}+T_{DATA}$  [Equation 3]

Referring to the above equations, the length of the PPDU is calculated based on a rounded up value of L_LENGTH/3. Therefore, for a random value of k, three different values of L_LENGTH={3k+1, 3k+2, 3(k+1)} indicate the same PPDU length.

Referring to FIG. 7(e), a universal SIG (U-SIG) field continues to exist in an EHT PPDU and a WLAN PPDU of a subsequent generation, and serves to classify a generation of a PPDU, which includes 11be. U-SIG is a 64 FFT-based OFDM 2 symbol and may transfer a total of 52 bits of information. In 52 bits, 43 bits excluding 9 bits for CRC/Tail are largely divided into a version independent (VI) field and a version dependent (VD) field.

A VI bit enables a current bit configuration to be maintained even later on, so that even if a PPDU of a subsequent generation is defined, current 11be terminals may obtain information on the PPDU via the VI fields of the PPDU. To this end, the VI field includes PHY version, UL/DL, BSS color, TXOP, and reserved fields. The PHY version field is 3 bits, and serves to sequentially classify 11be and subsequent generation wireless LAN standards into versions. 11be has a value of 000b. The UL/DL field identifies whether the PPDU is an uplink/downlink PPDU. BSS color indicates an identifier for each BSS defined in 11ax, and has a value of 6 bits or more. TXOP indicates transmit opportunity duration transmitted in a MAC header, wherein, by adding the TXOP to a PHY header, the PPDU may infer a length of the TXOP included therein without having to decode an MPDU, and the TXOP has a value of 7 bits or more.

The VD field is signaling information useful only for an 11be version of the PPDU, and may include a field commonly used in any PPDU format, such as PPDU format and BW, and a field defined differently for each PPDU format. The PPDU format is a classifier that classifies EHT single user (SU), EHT multiple user (MU), EHT trigger-based (TB), EHT extended range (ER) PPDU, etc. The BW field signals five basic PPDU BW options (BW, which is expressible in the form of an exponential power of 20*2, may be referred to as basic BW) of 20, 40, 80, 160 (80+80), and 320 (160+160) MHz and various remaining PPDU BWs configured via preamble puncturing. After being signaled at 320 MHz, signaling may be performed in a form in which some 80 MHz is punctured. A punctured and modified channel type may be signaled directly in the BW field, or may be signaled using the BW field with a field (e.g., a field within the EHT-SIG field) appearing after the BW field. If the BW field is configured to 3 bits, a total of 8 BW signaling may be performed, and therefore only up to 3 signaling may be performed in a puncturing mode. If the BW field is configured to 4 bits, a total of 16 BW signaling may be performed, and therefore up to 11 signaling may be performed in the puncturing mode.

A field located after the BW field varies depending on the type and format of the PPDU, an MU PPDU and an SU PPDU may be signaled in the same PPDU format, a field for classification between the MU PPDU and the SU PPDU may be located before an EHT-SIG field, and additional signaling may be performed for the same. Both the SU PPDU and the MU PPDU include the EHT-SIG field, but some fields that are not required in the SU PPDU may be compressed. Information on the field to which the compression has been applied may be omitted or may have a size smaller than a size of an original field included in the MU PPDU. For example, in a case of the SU PPDU, a common field of the EHT-SIG may be omitted or replaced, or the SU PPDU may have a different configuration in which a user specific field is replaced, reduced to one, or the like.

Alternatively, the SU PPDU may further include a compression field indicating whether compression is performed, and a part of field (e.g., RA fields, etc.) may be omitted according to a value of the compressed field.

If a part of the EHT-SIG field of the SU PPDU is compressed, information to be included in the compressed field may be signaled also in an uncompressed field (e.g., the common field, etc.). The MU PPDU corresponds to a PPDU format for concurrent reception by multiple users, and therefore the EHT-SIG field is required to be transmitted subsequently to the U-SIG field, and the amount of signaled information may vary. That is, a plurality of MU PPDUs are transmitted to a plurality of STAs, so that the respective STAs should recognize locations of RUs, at which the MU PPDUs are transmitted, the STAs to which the RUs have been allocated respectively, and whether the transmitted MU PPDUs have been transmitted to the STAs themselves. Therefore, an AP should transmit information described above, by including the same in the EHT-SIG field. To this end, information for efficient transmission of the EHT-SIG field is signaled in the U-SIG field, and this may correspond to an MCS that is a modulation method and/or the number of symbols in the EHT-SIG field. The EHT-SIG field may include information on a size and location of an RU allocated to each user.

In the case of the SU PPDU, a plurality of RUs may be allocated to an STA, and the plurality of RUs may be continuous or discontinuous. If the RUs allocated to the STA are discontinuous, the STA should recognize a punctured RU in the middle in order to efficiently receive the SU PPDU. Accordingly, the AP may transmit the SU PPDU including information (e.g., a puncturing pattern of the RUs, etc.) of punctured RUs among the RUs allocated to the STA. That is, in the case of the SU PPDU, a puncturing mode field, which includes information indicating, in a bitmap format, etc., a puncturing pattern and whether the puncturing mode is applied, may be included in the EHT-SIG field, and the puncturing mode field may signal a discontinuous channel type appearing within a bandwidth.

The signaled discontinuous channel type is limited, and indicates discontinuous channel information and BW of the SU PPDU in combination with a value of the BW field. For example, the SU PPDU is a PPDU transmitted only to a single terminal, so that the STA may recognize a bandwidth allocated to itself via the BW field included in the PPDU, and the SU PPDU may recognize a punctured resource in the allocated bandwidth via the puncturing mode field of the EHT-SIG field or the U-SIG field included in the PPDU. In this case, the terminal may receive the PPDU in resource units remaining after excluding a specific channel of the punctured resource unit. The plurality of RUs allocated to the STA may be configured by different frequency bands or tones.

Only a limited discontinuous channel type is signaled in order to reduce signaling overhead of the SU PPDU. Puncturing may be performed for each 20 MHz sub-channel, so that if puncturing is performed for BW having a large number of 20 MHz sub-channels, such as 80, 160, and 320 MHz, a discontinuous channel (if puncturing of only edge 20 MHz is considered to be discontinuous) type should be signaled in the case of 320 MHz by expressing whether each of 15 20 MHz sub-channels remaining after excluding a primary channel is used. As such, allocating 15 bits to signal a discontinuous channel type of single user transmission may act as excessively large signaling overhead in consideration of a low transmission rate of a signaling part.

The present invention proposes a technique for signaling a discontinuous channel type of an SU PPDU, and illustrates a discontinuous channel type determined according to the proposed technique. The present invention also proposes a technique for signaling each of puncturing types of primary 160 MHz and secondary 160 MHz in a 320 MHz BW configuration of an SU PPDU.

An embodiment of the present invention proposes a technique for differently configuring a PPDU indicated by preamble puncturing BW values according to a PPDU format signaled in a PPDU format field. It is assumed that a BW field is 4 bits, and in a case of an EHT SU PPDU or a TB PPDU, EHT-SIG-A of 1 symbol may be additionally signaled after U-SIG, or EHT-SIG-A may not be signaled at all, so that, in consideration of this, it is necessary to completely signal up to 11 puncturing modes via only the BW field of U-SIG. However, in a case of an EHT MU PPDU, EHT-SIG-B is additionally signaled after U-SIG, so that up to 11 puncturing modes may be signaled in a method different from that of the SU PPDU. In a case of an EHT ER PPDU, a BW field may be configured to 1 bit to signal whether the EHT ER PPDU is a PPDU using a 20 MHz or 10 MHz band.

FIG. 7(f) illustrates a configuration of a format-specific field of a VD field when the EHT MU PPDU is indicated in the PPDU format field of U-SIG. In the case of the MU PPDU, SIG-B, which is a signaling field for concurrent reception by multiple users, is essentially required, and SIG-B may be transmitted without separate SIG-A after U-SIG. To this end, information for decoding of SIG-B should be signaled in U-SIG. These fields include SIG-B MCS, SIG-B DCM, Number of SIG-B Symbols, SIG-B Compression, and Number of EHT-LTF Symbols.

FIG. 8 illustrates an example of various extremely high throughput (EHT) physical protocol data unit (PPDU) formats and a method for indicating the same according to an embodiment of the present invention.

Referring to FIG. 8, a PPDU may include a preamble and a data part, and an EHT PPDU format, that is a PPDU type, may be classified according to a U-SIG field included in the preamble. Specifically, based on a PPDU format field included in the U-SIG field, whether the format of the PPDU is an EHT PPDU may be indicated.

FIG. 8(a) shows an example of an EHT SU PPDU format for a single STA. An EHT SU PPDU is a PPDU used for single user (SU) transmission between an AP and a single STA, and an EHT-SIG-A field for additional signaling may be located after the U-SIG field.

FIG. 8(b) shows an example of an EHT trigger-based PPDU format which corresponds to an EHT PPDU transmitted based on a trigger frame. An EHT Trigger-based PPDU is an EHT PPDU transmitted based on a trigger frame and is an uplink PPDU used for a response to the trigger frame. Unlike in the EHT SU PPDU, an EHT-SIG-A field is not located after a U-SIG field in the EHT PPDU.

FIG. 8(c) shows an example of an EHT MU PPDU format which corresponds to an EHT PPDU for multiple users. An EHT MU PPDU is a PPDU used to transmit the PPDU to one or more STAs. In the EHT MU PPDU format, an HE-SIG-B field may be located after a U-SIG field.

FIG. 8(d) shows an example of an EHT ER SU PPDU format used for single user transmission with an STA in an extended range. An EHT ER SU PPDU may be used for single user transmission with an STA of a wider range compared to the EHT SU PPDU described in FIG. 8(a), and a U-SIG field may be repeatedly located on a time axis.

The EHT MU PPDU described in FIG. 8(c) may be used by an AP to perform downlink transmission to a plurality of STAs. Here, the EHT MU PPDU may include scheduling information so that the plurality of STAs may concurrently receive the PPDU transmitted from the AP. The EHT MU PPDU may transfer, to the STAs, AID information of a transmitter and/or a receiver of the PPDU transmitted via a user specific field of EHT-SIG-B. Accordingly, the plurality of terminals having received the EHT MU PPDU may perform a spatial reuse operation based on the AID information of the user specific field included in a preamble of the received PPDU.

Specifically, a resource unit allocation (RA) field of the HE-SIG-B field included in the HE MU PPDU may include information on a configuration of a resource unit (e.g., a division form of the resource unit) in a specific bandwidth (e.g., 20 MHz, etc.) of a frequency axis. That is, the RA field may indicate configurations of resource units segmented in a bandwidth for transmission of the HE MU PPDU, in order for the STA to receive the PPDU. Information on the STA allocated (or designated) to each segmented resource unit may be included in the user specific field of EHT-SIG-B so as to be transmitted to the STA. That is, the user specific field may include one or more user fields corresponding to the respective segmented resource units.

For example, a user field corresponding to at least one resource unit used for data transmission among the plurality of segmented resource units may include an AID of a receiver or a transmitter, and a user field corresponding to the remaining resource unit(s) which is not used for data transmission may include a preconfigured null STA ID.

For convenience of description, in this specification, a frame or a MAC frame may be used interchangeably with an MPDU.

When one wireless communication device communicates by using a plurality of links, the communication efficiency of the wireless communication device may be increased. In this case, the link may be a physical path, and may consist of one wireless medium that may be used to deliver a MAC service data unit (MSDU). For example, in a case where frequency band of one of the links is in use by another wireless communication device, the wireless communication device may continue to perform communication through another link. As such, the wireless communication device may usefully use a plurality of channels. In addition, when the wireless communication device performs communication simultaneously by using a plurality of links, the overall throughput may be increased. However, in the existing wireless LAN, it has been stipulated that one wireless communication device uses one link. Therefore, a WLAN operation method for using a plurality of links is required. A wireless communication method of a wireless communication device using a plurality of links will be described through FIGS. 9 to 26. First, a specific form of a wireless communication device using a plurality of links will be described through FIG. 9.

Figure 9:
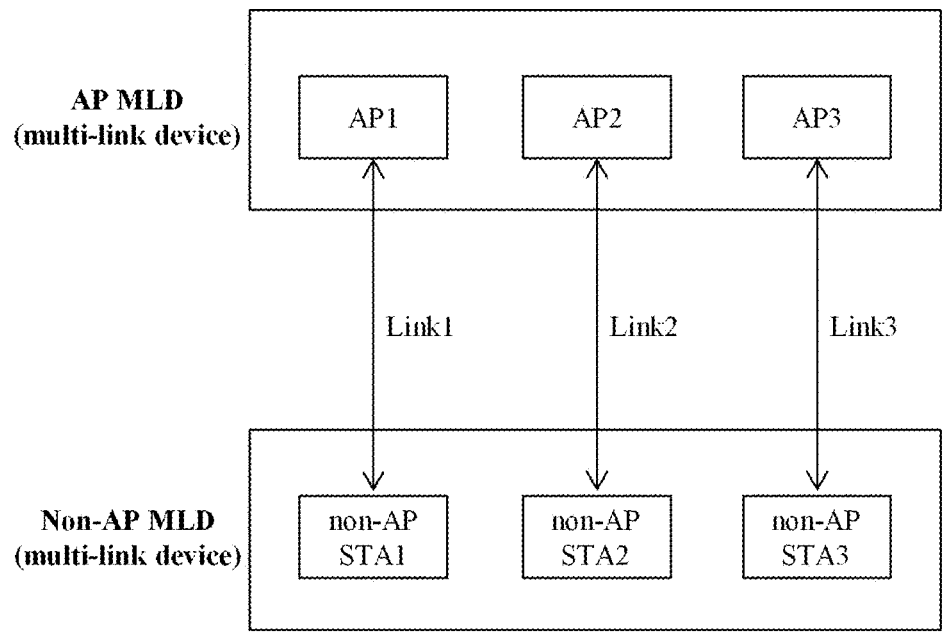
FIG. 9 illustrates a multi-link device according to an embodiment of the disclosure.

FIG. 9 illustrates a multi-link device according to an embodiment of the disclosure.

A multi-link device (MLD) may be defined for a wireless communication method using the plurality of links described above. The multi-link device may represent a device having one or more affiliated stations. According to a specific embodiment, the multi-link device may represent a device having two or more affiliated stations. In addition, the multi-link device may exchange multi-link elements. The multi-link element includes information on one or more stations or one or more links. The multi-link element may include a multi-link setup element, which will be described later. In this case, the multi-link device may be a logical entity. Specifically, the multi-link device may have a plurality of affiliated stations. The multi-link device may be referred to as a multi-link logical entity (MLLE) or a multi-link entity (MLE). The multi-link device may have one medium access control (MAC) service access point (SAP) up to logical link control (LLC). The MLD may also have one MAC data service.

A plurality of stations included in the multi-link device may operate on a plurality of links. In addition, a plurality of stations included in the multi-link device may operate on a plurality of channels. Specifically, the plurality of stations included in the multi-link device may operate on a plurality of different links or on a plurality of different channels. For example, a plurality of stations included in the multi-link device may operate on a plurality of different channels of 2.4 GHz, 5 GHz, and 6 GHz.

The operation of the multi-link device may be referred to as a multi-link operation, an MLD operation, or a multi-band operation. In addition, when the station affiliated with the multi-link device is an AP, the multi-link device may be referred to as the AP MLD. In addition, when the station affiliated with the multi-link device is a non-AP station, the multi-link device may be referred to as a non-AP MLD.

FIG. 9 illustrates an operation in which a non-AP MLD and an AP-MLD communicate. Specifically, the non-AP MLD and the AP-MLD communicate by using three links, respectively. The AP MLD includes a first AP AP1, a second AP AP2, and a third AP AP3. The non-AP MLD includes a first non-AP STA (non-AP STA1), a second non-AP STA (non-AP STA2), and a third non-AP STA (non-AP STA3). The first AP AP1 and the first non-AP STA (non-AP STA1) communicate through a first link Link1. In addition, the second AP AP2 and the second non-AP STA (non-AP STA2) communicate through a second link Link2. In addition, the third AP AP3 and the third non-AP STA (non-AP STA3) communicate through a third link Link3.

The multi-link operation may include a multi-link setup operation. The multi-link setup may correspond to an association operation of the single link operation described above and may be preceded first for frame exchange in the multi-link. The multi-link device may obtain information necessary for the multi-link setup from a multi-link setup element. Specifically, the multi-link setup element may include capability information associated with the multi-link. In this case, the capability information may include information indicating whether any one of the plurality of devices included in the multi-link device performs the transmission and simultaneously, another device may perform the reception. In addition, the capability information may include information on the links available to each station included in the MLD. In addition, the capability information may include information on the channels available to each station included in the MLD.

The multi-link setup may be set up through negotiation between peer stations. Specifically, the multi-link setup may be performed through communication between stations without communication with the AP. In addition, the multi-link setup may be set up through any one link. For example, even if the first link to the third link are set through the multi-link, the multi-link setup may be performed through the first link.

In addition, a mapping between a traffic identifier (TID) and a link may be set up. Specifically, frames corresponding to a TID of a particular value may only be interchanged through a pre-specified link. The mapping between the TID and the link may be set up with directional-based. For example, when a plurality of links is set up between the first multi-link device and the second multi-link device, the first multi-link device may be set to transmit a frame of the first TID to the plurality of first links, and the second multi-link device may be set to transmit a frame of the second TID to the first link. In addition, there may be a default setting for the mapping between the TID and the link. Specifically, in the absence of additional setup in the multi-link setup, the multi-link device may exchange frames corresponding to the TID at each link according to the default setting. In this case, the default setting may be that all the TIDs are exchanged in any one link.

A TID will be described in detail. The TID is an ID for classifying traffic and data in order to support quality of service (QoS). In addition, the TID may be used or allocated in a higher layer than a MAC layer. In addition, the TID may indicate a traffic category (TC) or a traffic stream (TS). In addition, the TID may be classified as 16 types. For example, the TID may be designated as one of the values in the range of 0 to 15. A TID value to be used may be differently designated according to an access policy and a channel access or medium access method. For example, in the case that enhanced distributed channel access (EDCA) or hybrid coordination function contention based channel access (HCAF) is used, the TID may be assigned with a value in the range of 0 to 7. In the case that the EDCA is used, the TID may indicate a user priority (UP). In this instance, the UP may be designated based on a TC or a TS. The UP may be allocated in a higher layer than MAC. In addition, in the case that HCF controlled channel access (HCCA) or SPCA is used, the TID may be assigned with a value in the range of 8 to 15. In the case that the HCCA or SPCA is used, the TID may indicate a TSID. In addition, in the case that the HEMM or the SEMM is used, the TID may be assigned with a value in the range of 8 to 15. In the case that the HEMM or SEMM is used, the TID may indicate a TSID.

A UP and an AC may be mapped. The AC may be a label for providing a QoS in EDCA. The AC may be a label for indicating an EDCA parameter set. An EDCA parameter or an EDCA parameter set may be a parameter used for EDCA channel contention. A QoS station may guarantee a QoS using the AC. In addition, the AC may include AC_BK, AC_BE, AC_VI, and AC_VO. The AC_BK, AC_BE, AC_VI, and AC_VO may indicate a background, a best effort, a video, and a voice, respectively. In addition, each of the AC_BK, AC_BE, AC_VI, and AC_VO may be classified into subordinate ACs. For example, the AC_VI may be subdivided into AC_VI primary and AC_VI alternate. In addition, the AC_VO may be subdivided into AC_VO primary and AC_VO alternate. In addition, a UP or a TID may be mapped to an AC. For example, a UP or TID having a value of 1, 2, 0, 3, 4, 5, 6, and 7 may be mapped to AC_BK, AC_BK, AC_BE, AC_BE, AC_VI, AC_VI, AC_VO, and AC_VO, respectively. In addition, a UP or TID having a value of 1, 2, 0, 3, 4, 5, 6, and 7 may be mapped to AC_BK, AC_BK, AC_BE, AC_BE, AC_VI alternate, AC_VI primary, AC_VO primary, and AC_VO alternate, respectively. In addition, a UP or TID having a value of 1, 2, 0, 3, 4, 5, 6, and 7 may sequentially have a high priority. That is, 1 denotes a low priority and 7 denotes a high priority. Therefore, AC_BK, AC_BE, AC_VI, and AC_VO may have high priorities, sequentially. In addition, AC_BK, AC_BE, AC_VI, and AC_VO may correspond to an AC index (ACI) 0, 1, 2, and 3, respectively. Due to such features of a TID, a mapping between a TID and a link may indicate a mapping between an AC and a link. In addition, a mapping between a link and an AC may indicate a mapping between a TID and a link.

As described above, a TID may be mapped to each of a plurality of links. Mapping may be designating a link in which traffic corresponding to a predetermined TID or AC is capable of being exchanged. In addition, a TID or AC that is transmittable for each transmission direction in a link may be designated. As described above, there may be a default configuration for a mapping between a TID and a link. Specifically, in the case that an additional configuration does not exist for a multi-link configuration, a multi-link device may exchange a frame corresponding to a TID in each link according to the default configuration. In this instance, the default configuration may be exchanging all TIDs in any one link. Any TID or AC at any point in time may be always mapped to at least any one link. A management frame and a control frame may be transmitted in all links.

In the case that a link is mapped to a TID or an AC, only a data frame corresponding to the TID or AC mapped to the corresponding link may be transmitted in the corresponding link. Therefore, in the case that a link is mapped to a TID or an AC, a frame that does not correspond to the TID or AC mapped to the corresponding link may not be transmitted in the corresponding link. In the case that a link is mapped to a TID or an AC, an ACK may also be transmitted based on the link to which the TID or the AC is mapped. For example, a block ACK agreement may be determined based on a mapping between a TID and a link. According to another embodiment, a mapping between a TID and a link may be determined based on a block ACK agreement. Particularly, a block ACK agreement may be set for a TID mapped to a predetermined link.

A QoS may be guaranteed via the above-described mapping between a TID and a link. Specifically, an AC or TID having a high priority may be mapped to a link in which a relatively small number of stations operate or a link having a good channel condition. In addition, via the above-described mapping between a TID and a link, a station may be enabled to maintain a power-saving state during a long period of time.

Figure 10:
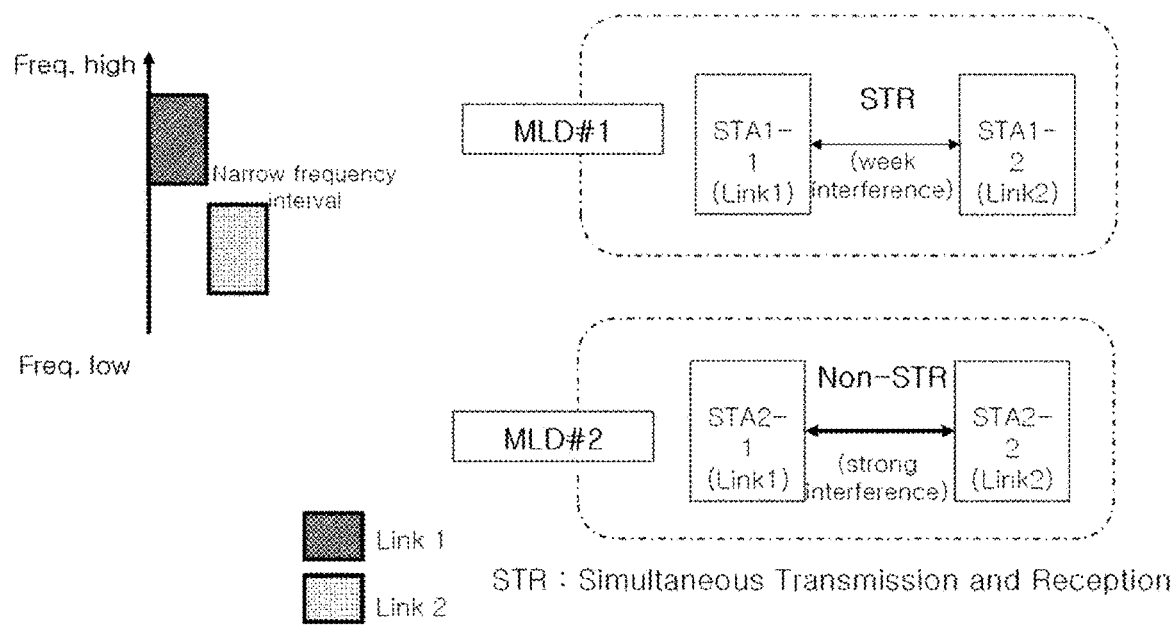
FIG. 10 illustrates simultaneous transmissions in different links in a multi-link operation according to an embodiment of the disclosure.

FIG. 10 illustrates the simultaneous performance of transmission of different links in a multi-link operation according to an embodiment of the disclosure.

According to implementation of a multi-link device, the simultaneous operation may not be supported in the multi-link. For example, simultaneous transmission in a plurality of links, simultaneous reception in a plurality of links, or transmission in one link and reception of another link by the multi-link device may be not supported. This is because reception or transmission performed in one link may influence reception or transmission performed in another link. Specifically, transmission in one link may act as interference to another link. Interference applied from one link to another link by one multi-link device may be referred to as internal leakage. As a frequency interval between links is smaller, internal leakage may become larger. When internal leakage is not very large, transmission may be performed in another link while transmission is performed in one link. When internal leakage is large, transmission cannot be performed in another link while transmission is performed in one link. As described above, simultaneously performing the operations in a plurality of links by the multi-link device may be referred to as simultaneous transmit and receive or simultaneous transmission and reception (STR). For example, simultaneous transmission in a plurality of links, transmission in one link and reception in another link at the same time, or simultaneous reception in a plurality of links by the multi-link device may be referred to as STR.

As mentioned above, the multi-link device may support STR or support the same only restrictively. Specifically, the multi-link device may support STR in a specific condition. For example, when the multi-link device operates as a single radio device, the multi-link device may not perform STR.

Further, when the multi-link device operates as a single antenna, STR of the multi-link device may not be performed. When internal leakage having the size larger than or equal to a predetermined size is detected, the multi-link device may not perform STR.

A station may exchange information on an STR capability of the station with another station. Specifically, the station may exchange information on whether a capability of simultaneously performing transmission in a plurality of links or simultaneously performing reception in a plurality of links by the station is restricted with another station. Specifically, the information on whether the capability of performing transmission or reception in a plurality of links is restricted may indicate whether simultaneous transmission, simultaneous reception, or simultaneous transmission and reception can be performed in a plurality of links. The information on whether the capability of performing transmission or reception in a plurality of links is restricted may be information indicated for each step. Specifically, the information on whether the capability of performing transmission or reception in a plurality of links is restricted may be information indicating a step of representing the size of internal leakage. In a detailed embodiment, the information indicating the step of representing the size of internal leakage may be information indicating a step of representing the size of interference generated due to internal leakage. In another detailed embodiment, the information may be information indicating a step of representing a frequency interval between links that may influence internal leakage. The information indicating the step of representing the size of internal leakage may be information indicating the relation between the frequency interval between links and the size of internal leakage.

In FIG. 10, a first station (STA1) and a second station (STA2) is affiliated with one non-AP multi-link device. A first AP (AP1) and a second AP (AP2) may be affiliated with one non-AP multi-link device. A first link (link 1) is configured between the first AP (AP1) and the first station (STA1), and a second link (link 2) is configured between the second AP (AP2) and the second station (STA2). In FIG. 10, the non-AP multi-link device may restrictively perform STR. When the second station (STA2) performs transmission in the second link (link2), reception of the first station (STA1) in the first link (link1) may be disturbed by transmission performed in the second link (link2). For example, in the following case, reception of the first station (STA1) in the first link (link1) may be interrupted by transmission performed in the second link (link2). The second station (STA2) transmits first data (data 1) in the second link (link 2), and the first AP (AP1) transmits a response (ack for data1) to the first data (data1) to the first station (STA1). The second station (STA2) transmits second data (data2) in the second link (link2). At this time, a transmission time point of the second data (data2) may overlap a transmission time point of the response (ack for data1) to the first data (data1). The first link (link1) may be interfered by transmission to the second station (STA2) in the second link (link 2). Accordingly, the first station (STA1) may not receive the response (ack for data1) to the first data (data1).

An operation in which the multi-link device performs channel access is described. The operation of the multi-link without detailed description may follow the channel access described with reference to FIG. 6.

The multi-link device may independently perform channel access in a plurality of links. At this time, the channel access may be backoff-based channel access. When the multi-link device independently performs the channel access in a plurality of links and a backoff counter reaches 0 in the plurality of links, the multi-link device may simultaneously perform transmission in the plurality of links. In a detailed embodiment, when one of the backoff counters of the multi-link reach 0 and a predetermined condition is satisfied, the multi-link device may perform channel access not only in the link in which the backoff counter reaches 0 but also in another link in which the backoff counter does not reach 0. Specifically, when one of the backoff counters of the multi-link reaches 0, the multi-link device may detect energy in another link in which the backoff counter does not reach 0. At this time, when energy having a predetermined size or larger is not detected, the multi-link device may perform channel access not only in the link in which the backoff counter reaches 0 but also in the link in which energy is detected. Accordingly, the multi-link device may simultaneously perform transmission in the plurality of links. The size of a threshold value used for energy detection may be smaller than the size of a threshold value used for determining whether to reduce the backoff counter. Further, when it is determined whether to reduce the backoff counter, the multi-link device may detect any type of signal as well as a WLAN signal. In the energy detection, the multi-link device may detect any type of signal as well as the WLAN signal. Internal leakage may not be detected by the WLAN signal. In this case, the multi-link device may sense a signal detected due to internal leakage by energy detection. Further, as described above, the size of a threshold value used for energy detection may be smaller than the size of a threshold value used for determining whether to reduce the backoff counter. Accordingly, the multi-link device may reduce the backoff counter in another link even while transmission is performed in one link.

According to a degree of interference between links used by the multi-link device, the multi-link device may determine whether the station operating in each link may independently operate. At this time, the degree of interference between links may be the size of interference detected by, when one station performs transmission in one link, another station of the multi-link device. When transmission by the first station of the multi-link device in the first link gives interference having a predetermined size or larger to the second station of the multi-link device operating in the second link, the operation of the second station may be restricted. Specifically, reception or channel access of the second station may be restricted. This is because, when interference is generated, the second station may fail in decoding of the received signal due to interference. Further, this is because, when interference is generated, the second station may determine that the channel is being used when the second station performs channel access using the backoff.

When transmission by the first station of the multi-link device in the first link gives interference having a size smaller than a predetermined size to the second station of the multi-link device operating in the second link, the first station and the second station may independently operate. Specifically, when transmission by the first station of the multi-link device in the first link gives interference having a size smaller than a predetermined size to the second station of the multi-link device operating in the second link, the first station and the second station may independently perform channel access. Further, when transmission by the first station of the multi-link device gives interference having a size smaller than a predetermined size to the second station of the multi-link device operating in the second link, the first station and the second station may independently perform transmission or reception. This is because, when interference having the size smaller than the predetermined size is generated, the second station may succeed in decoding the received signal even when the interference exists. Further, this is because, when interference having the size smaller than the predetermined size is generated, the second station may determine that the channel is idle when the second station performs channel access using the backoff.

The degree of interference generated between stations of the multi-link device may vary depending on a hardware characteristic of the multi-link device as well as the interval between frequency bands of the links in which the stations operate. For example, internal interference generated in the multi-link device including an expensive radio frequency (RF) device may be smaller than internal interference generated in the multi-link device including a cheap RF device. Accordingly, the degree of interference generated between the stations of the multi-link device may be determined based on a characteristic of the multi-link device.

FIG. 10 illustrates that the size of generated interference varies depending on the interval between frequency bands of the links and the characteristic of the multi-link device. In the embodiment of FIG. 10, a first multi-link device (MLD #1) includes a first station (STA1-1) operating in a first link (link1) and a second station (STA1-2) operating in a second link (link2). A second multi-link device (MLD #2) includes a first station (STA2-1) operating in a first link (link1) and a second station (STA2-2) operating in a second link (link2). A frequency interval between the first link (link1) and the second link (link2) in which the first multi-link device (MLD #1) operates is the same as a frequency interval between the first link (link1) and the second link (link2) in which the second multi-link device (MLD #2) operates. However, the size of generated interference may be different due to difference between a characteristic of the first multi-link device (MLD #1) and a characteristic of the second multi-link device (MLD #2). Specifically, the size of interference generated in the first multi-link device (MLD #1) may be larger than the size of interference generated in the second multi-link device (MLD #2). As described above, the size of generated interference may vary depending on the characteristic of the multi-link device, and it may be required to exchange information on whether STR is supported when it is considered that whether STR is supported is different according to each multi-link device.

The multi-link device may signal information on whether STR is supported by the station included in the multi-link device. Specifically, an AP multi-link device and a non-AP multi-link device may exchange information on whether STR is supported by the AP included in the AP multi-link device and whether STR is supported by the STA included in the non-AP multi-link device. In such embodiments, an element indicating whether STR is supported may be used. The element indicating whether STR is supported may be referred to as an STR support element. The STR support element may indicate whether STR is supported by the station of the multi-link device transmitting the STR support element through 1 bit. Specifically, the STR support element may indicate whether STR is supported by each station included in the multi-link device transmitting the STR support element by 1 bit. At this time, a value of the bit may be 1 when the station supports STR, and the value of the bit may be 0 when the station does not support STR. When the multi-link device transmitting the STR support element includes a first station (STA1), a second station (STA2), and a third station (STA3), the first station (STA1) and the third station (STA3) support STR, and the second station (STA2) does not support STR, the STR support element may include a field having 1011b. It is assumed that stations operating in different frequency bands support STR, and the STR support element may omit signaling indicating whether STR is supported between the stations operating in different frequency bands. For example, the first station (STA1) operates in a first link of 2.4 GHz, and the second station (STA2) and the third station (STA3) operate in a second link and a third link of 5 GHz, respectively. The STR support element may indicate that STR is supported between the second station (STA2) and the third station (STA3) by using 1 bit. Further, the STR support element may include only 1 bit when the number of stations signaled by the STR support element is 2.

In a detailed embodiment, the relation between the link located in 2.4 GHz and the link located in 5 GHz or 6 GHz among the links of the multi-link device may be always determined to STR. Accordingly, signaling for STR of the link located in 2.4 GHz and the link located in 5 GHz or 6 GHz may be omitted.

In the above-described embodiments, the operation described as an operation of a station of a multi-link device may be substituted with an operation of a multi-link device. In addition, in the above-described embodiments, the operation of an AP may be substituted with an operation of a non-AP station, and the operation of a non-AP station may be substituted with an operation of an AP. Accordingly, the operation of an AP of a non-STR multi-link device may be substituted with an operation of a non-AP station of a non-STR multi-link device, and the operation of a non-AP station of an STR multi-link device may be substituted with an operation of an AP of an STR multi-link device. In addition, the operation of a non-AP station of a non-STR multi-link device may be substituted with an operation of an AP of a non-STR multi-link device, and the operation of an AP of an STR multi-link device may be substituted with an operation of a non-AP station of an STR multi-link device.

Scheduling for low latency traffic transmission is described through FIGS. 11 to 15. In the conventional wireless LAN communication, it is supported that a channel access parameter is configured for each AC through an enhanced distributed channel access (EDCA), and traffic is processed according to the priority of each AC by using the configured channel access parameter. However, the conventional EDCA provided channel access probabilistically having a higher priority, and thus was insufficient to support transmission of low latency traffic. To complement this, a timer interval in which low latency traffic can be prioritized to be transmitted may be configured. For convenience of description, the time interval in which the low latency traffic is prioritized to be transmitted is referred to as a restricted service period. Most services requiring low latency traffic transmission, such as VR/AR, require periodic traffic transmission, and thus the restricted service period is highly advantageous in reducing delay in the low latency traffic transmission.

The restricted service period may be a time interval in which transmission of low latency traffic and transmission of a response to the low latency traffic are prioritized to be allowed. Specifically, the restricted service period may be a time interval in which transmission of low latency traffic and transmission of a response to the low latency traffic are only allowed. In another specific embodiment, the restricted service period may be a time interval in which transmission of low latency traffic and transmission of a response to the low latency traffic are performed and transmission of traffic other than the low latency traffic is allowed after the transmission of the low latency traffic and transmission of the response to the low latency traffic are completed.

First, a method of configuring a restricted service period is described. The restricted service period may be configured through a TWT of the conventional WLAN. The TWT configures a service period through a negotiation between an AP and a station, and supports that the AP and the station perform transmission and reception in an interval corresponding to a service period, and enter a low power mode in an interval other than the service period. A detailed description thereof will be made through FIG. 11. For convenience of description, configuration of a restricted service period through a TWT and operations of an AP and a station, which are based on the restricted service period, are referred to as a restricted TWT.

Figure 11:
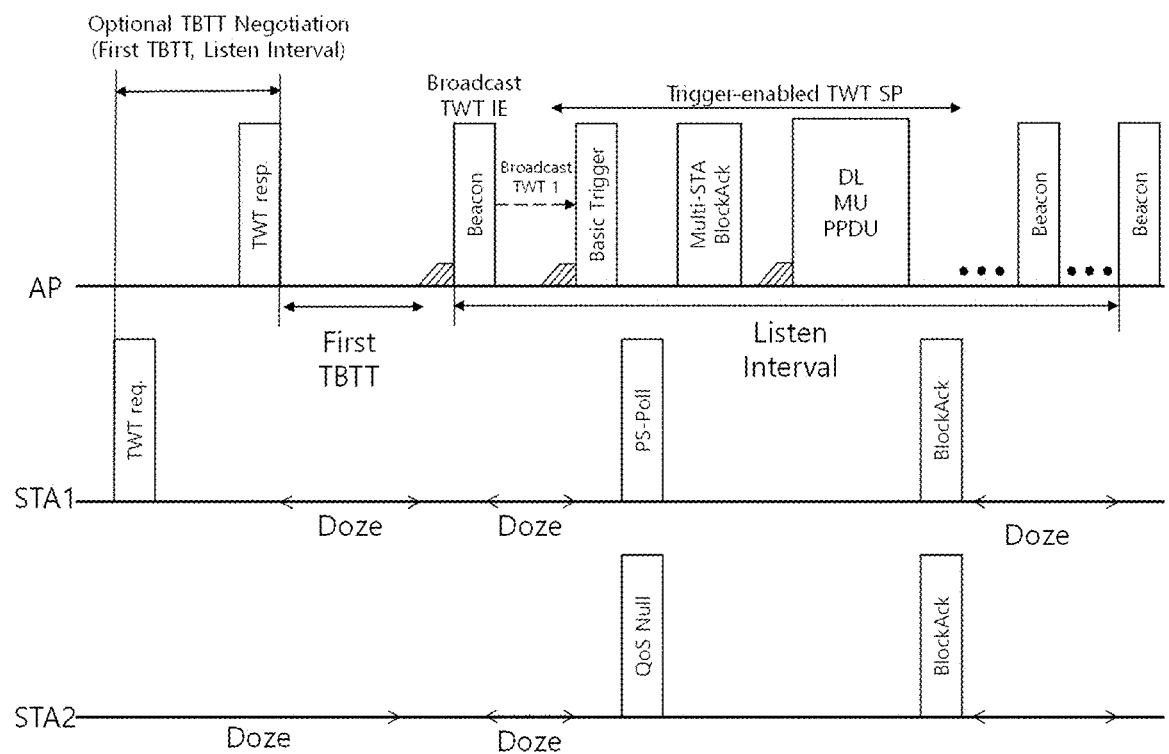
FIG. 11 illustrates a method for configuring a broadcast TWT between an AP and a station according to an embodiment of the disclosure.

FIG. 11 illustrates a method of configuring a broadcast TWT between an AP and a station according to an embodiment of the disclosure.

A service period in a TWT may be configured as follows. An AP requests a station to participated in a TWT, the station being associated with the AP. The station may participate in a broadcast TWT, or may negotiate with the AP about an individual TWT. In this case, the AP may request the station to participate in the TWT by configuring a value of a TWT required subfield of a HE operation element as 1. In addition, the AP may transmit a broadcast TWT element through a management frame, e.g., a beacon frame, to transfer information required for the participation in the broadcast TWT, to the station. In this case, the AP may perform signaling of supporting of the broadcast TWT by configuring dot11TWTOptionActivated as "true", and configuring a broadcast TWT support field (element) of a HE capabilities element as 1. The AP may configure a restricted service interval to be similar to a service period of a TWT.

In an embodiment of FIG. 11, a first station (STA 1) requests TWT configuration from an AP. The AP and the first station (STA 1) configure a TWT parameter, for example, a first TBTT and a listen interval. Accordingly, the AP, the first station (STA 1), and a second station (STA 2) configure a broadcast TWT. The AP indicates a broadcast TWT service period by using a beacon frame. In the broadcast TWT service period, the AP may trigger uplink (UP) transmission by transmitting a downlink (DL) physical layer protocol data unit (PPDU) to the first station (STA 1) and the second station (STA 2), or transmitting a trigger frame to the first station (STA 1) and the second station (STA 2). In the broadcast TWT service period, the first station (STA 1) and the second station (STA 2) wake up to receive the beacon frame. The first station (STA 1) and the second station (STA 2) obtain information on the TWT from the received beacon frame. The AP transmits the trigger frame to the first station (STA 1) and the second station (STA 2), the first station (STA 1) transmits a PS-Poll frame to the AP, and the second station (STA 2) transmits a QoS null frame to the AP. The AP receives the PS-Poll frame and the QoS null frame transmitted by the first station (STA 1) and the second station (STA 2), and determines that the first station (STA 1) and the second station (STA 2) are in an awake state. The AP transmits a multi-STA block ACK frame to the first station (STA 1) and the second station (STA 2). The AP transmits a DL PPDU to the first station (STA 1) and the second station (STA 2).

In the conventional service period, a station not participating in the TWT is not restricted to perform channel access or perform transmission. This is because the TWT is for assisting a station participating in the TWT in entering a doze state. However, a restricted service period for preventing delay in transmission of low latency traffic needs to guarantee priority transmission of the low latency traffic, and thus a method for protecting the restricted service period is required.

During the restricted service period, a station not participating in a restricted TWT may be restricted to perform channel access. Specifically, during the restricted service period, the station not participating in the restricted TWT may fail to perform channel access. During the restricted service period, when the station not participating in the restricted TWT completes channel access, the corresponding station may restart a channel access procedure without performing transmission. In this case, the station may restart the channel access procedure when the restricted service period is terminated. In addition, channel access of the station may indicate an EDCA backoff procedure. The completion of channel access may indicate that a backoff counter of the EDCA backoff procedure reaches 0. In addition, when the station restarts the channel access procedure, the station may obtain a random integer within a CW used for the immediately preceding channel access, and use the obtained integer as a backoff counter. That is, the station may not double the size of the CW used for the immediately preceding channel access. In this case, the CW may be maintained for each AC. Such channel access restriction is applicable only to a station supporting the restricted TWT. Specifically, such channel access restriction is applicable to a station among non-legacy (EHT) stations, which has dot11RestrictedTWTOptionImplemented of an EHT capabilities element, configured as "true", and may not be applied to a station among non-legacy (EHT) stations, which has dot11RestrictedTWTOptionImplemented of the EHT capabilities element, configured as "false". In the disclosure, a non-legacy station may indicate an EHT station and a station after the EHT station. In addition, a legacy station, as a station before the EHT station, may indicate a non-HT station, an HT station, a VHT station, and a HE station.

In addition, during the restricted service period, for the non-legacy station, an NAV may be configured in traffic other than low latency traffic. Specifically, like the configuration of the NAV in traffic other than the low latency traffic, the station may suspend a channel access procedure for transmission of traffic other than the low latency traffic. In such embodiment, the NAV may be an NAV independent from the conventional NAV (basic NAV or intra-BSS NAV). In this case, the non-legacy station may be limited to a station supporting the restricted TWT. In another specific embodiment, the non-legacy station may be limited to a station participating in the restricted TWT.

The restricted service period may be included in the broadcast TWT service period. In another specific embodiment, the restricted service period may not be included in the broadcast TWT service period.

In addition, the restricted service period may be repeated according to a cycle designated by the AP. That is, the AP may designate a repetition cycle of the restricted service period. Accordingly, the AP may not always transmit a TWT element of a beacon frame to configure the restricted service period. In this case, the cycle of the service period may be configured according to the characteristics of a low latency service for which the low latency traffic is used. For example, the cycle of the low latency service period in which low latency traffic is generated every 50 ms may be 50 ms.

In addition, a quiet interval may be configured for a station not supporting the restricted TWT. In the conventional wireless LAN, the quiet interval is an interval for supporting channel sensing. When the quiet interval is configured, all stations suspend transmission. The restricted service period may be protected by using the characteristics of the quiet interval. A description thereof will be made through FIG. 26. In this case, the station not supporting the restricted TWT may be limited to the legacy station.

FIG. 12 illustrates configuring a quiet interval by an AP according to an embodiment of the disclosure.

An AP operating a restricted TWT may configure a quiet interval by transmitting a quiet element. During the quiet interval, a station suspends channel access. However, when channel access by a station participating in the restricted TWT is also limited, transmission of low latency traffic cannot be performed. Accordingly, the station participating in the restricted TWT may ignore a quiet interval corresponding to a restricted service period. In this case, the quiet interval corresponding to the restricted service period indicates a quiet interval configured to protect the restricted service period of the restricted TWT. Specifically, the station participating in the restricted TWT may consider the quiet interval corresponding to the restricted service period as a restricted service period. The AP operating the restricted TWT may not configure the quiet interval to match with the restricted service period. This is because, in the quiet element, the quiet interval is configured in units of time units (TU, 1024 us), and the TWT is configured in units of 256 us.

However, channel access is performed in a quiet interval other than the quiet interval which is not configured for the restricted service period, the quiet interval not configured for the restricted service period may be interrupted. Accordingly, a quiet interval configured for the restricted service period, that is, a quiet interval corresponding to the restricted service period, needs to be distinguished. Therefore, the station participating in the restricted TWT may fail to ignore the quiet interval not corresponding to the restricted service period. In the quiet interval not corresponding to the restricted service period, the station cannot not perform all transmissions. Specifically, the station participating in the restricted TWT may not be able to ignore the quiet interval not overlapping with the restricted service period. In a specific embodiment, the station participating in the restricted TWT may perform all transmissions in the quiet interval not overlapping with the restricted service period.

In addition, in the embodiments above, when a start time point of the restricted service period and a start time point of the quiet interval are within a predetermined time and a start time point of a service period and a start time point of the quiet interval are within a predetermined time, the station participating in the restricted service period may consider the quiet interval as a quiet interval corresponding to the restricted service period. As described above, this is because the AP operating the restricted TWT may not configure the quiet interval and the restricted service period to match.

In an embodiment of FIG. 11, an AP configures a quiet interval and a restricted service period by transmitting a beacon frame. In (a) of FIG. 11, a quiet interval and a restricted service period are configured as the same time interval. Accordingly, a station participating in a restricted TWT performs channel access in the quiet interval. In (b) of FIG. 11, a quiet interval is configured as an interval between a time point earlier than a start time point of a restricted service period and a time point later than an end time point of the restricted service period. In (b) of FIG. 11, a station participating in a restricted TWT is restricted to perform channel access in a quiet interval not overlapping with the restricted service period. The station participating in the restricted TWT performs channel access in a quiet interval overlapping with the restricted service period.

As described above, during the restricted service period, channel access may be restricted. Accordingly, such restriction is applicable to TXOP configuration. A description thereof will be made through FIG. 12.

FIG. 12 illustrates a method of configuring a TXOP by a station in consideration of a restricted service period according to an embodiment of the disclosure.

A station having obtained a TXOP before a restricted service period starts, that is, a station corresponding to a TXOP holder, may need to terminate the TXOP before the restricted service period starts. This is because even in a case where the restricted service period is started, when frame exchange of the TXOP holder is continued, transmission of low latency traffic may be interrupted. In this case, the station may be a non-legacy station. In another specific embodiment, the station may be limited to a station supporting the restricted TWT. That is, such restriction may not be applied to a station having a field value of dot11RestrictedTWTOptionImplemented configured as "false".

In a specific embodiment, when a station corresponding to a TXOP holder transmits low latency traffic, frame exchange may be continued even after the restricted service period starts.

A specific method of terminating a TXOP before a restricted service period by a station is described.

A station may configure a TXOP based on a restricted service period. Specifically, the station may configure an end time point of the TXOP as a time point before a start of the restricted service period. In this case, the station may configure duration of an initiating frame which initiates a frame exchange sequence, as duration before the start of the restricted service period. In this case, the station may configure duration of the initiating frame which initiates the frame exchange sequence, as duration before the restricted service period. For example, if a time point at which the station successfully performs channel access is 3 m before the start of the restricted service period, the station may configure the TXOP to be before 3 ms. In addition, the station may terminate the TXO by transmitting a CTS-to-Self frame. In this case, the station may transmit the CTS-to-Self frame at a basic transmission rate, 6 Mbps. This is because more legacy stations can receive the frame when the station transmits the frame at the basic transmission rate.

In another specific embodiment, the station may transmit an CF-End frame before the start of the restricted service period. Accordingly, the station may terminate the TXOP before the start of the restricted service period. In this case, the station may transmit the CF-End frame at the basic transmission rate, 6 Mbps. This is because more legacy stations can receive the frame when the station transmits the frame at the basic transmission rate.

In addition, a station not corresponding to the TXOP holder may release, at a start time point of the restricted service period, a NAV configured before the start of the restricted service period. In this case, the station may be a station supporting a restricted TWT. That is, the station may be a station having a field value of dot11RestrictedTWTOptionImplemented configured as "true". Even through the station does not correspond to the TXOP holder, the station does not support the restricted TWT, the station cannot release, at the start time point of the restricted service period, the NAV configured before the start of the restricted service period. However, when duration of the TXOP remaining after the station completes frame exchange is less than double of a sum of an SIFS and a time required to transmit the CF-End frame, the station may not transmit the CF-End frame. In this case, the station may consider that the TXOP is released at the start time point of the restricted service period. Specifically, the station may consider that a basic NAV is released at the start time point of the restricted service period.

In another specific embodiment, the station may be limited to a station participating in the restricted TWT.

In an embodiment of FIG. 13, an AP transmits a beacon frame including a TWT element to perform signaling of configuration of a restricted service period. In an embodiment of (a) of FIG. 13, a station configures a TXOP by transmitting an RTS frame. In this case, the station configures a value of a duration field of the RTS frame as before a restricted service period. The station performs frame exchange with the AP, and completes the frame exchange before a start of the restricted service period. In this case, the station lastly transmits a CTS-to-Self frame. In an embodiment (b) of FIG. 13, a station configures a TXOP by transmitting an RTS frame. In this case, the station configures a value of a duration field of the RTS frame without considering the restricted service period. The station performs frame exchange with the AP and completes the frame exchange before a start of the restricted service period. In this case, the station releases the TXOP by lastly transmitting a CF-End frame.

In the conventional wireless LAN operation, as an exception to a TXOP rule, an operation in which transmission can be performed exceeding a TXOP limit is defined. For example, retransmission of a single MPDU, single MSDU transmission under block ack agreement (not included in an A-MSDU an A-MPDU including two or more MPDUs), and transmission of a control frame and a QoS null frame (not included in the A-MPDU including two or more MPDUs) may be performed exceeding the TXOP limit. When such an exception is admitted for the restricted service period, transmission of the low latency traffic may be delayed. Such an exception to the TXOP limit cannot be applied while invading the restricted service period.

When an end time point of the TXOP and a start time point of the restricted service period are within a predetermined time difference, the station may determine that the TXOP is a TXOP obtained before the start of the restricted service period. The predetermined time may be 100 us. In another specific embodiment, when the end time point of the TXOP is within the restricted service period, the station may determine that the TXOP is a TXOP obtained before the start of the restricted service period.

As described above, the station may need to complete the frame exchange before the restricted service period. Accordingly, the station may not be allowed to start the frame exchange when an end time point of the frame exchange is within the restricted service period. In this case, the station may complete the frame exchange before the restricted service period by performing fragmentation.

In addition, when low latency traffic is transmitted in the frame exchange performed by the station corresponding to the TXOP holder, the station may continue to perform the frame exchange even after the start of the low latency service period.

Figure 14:
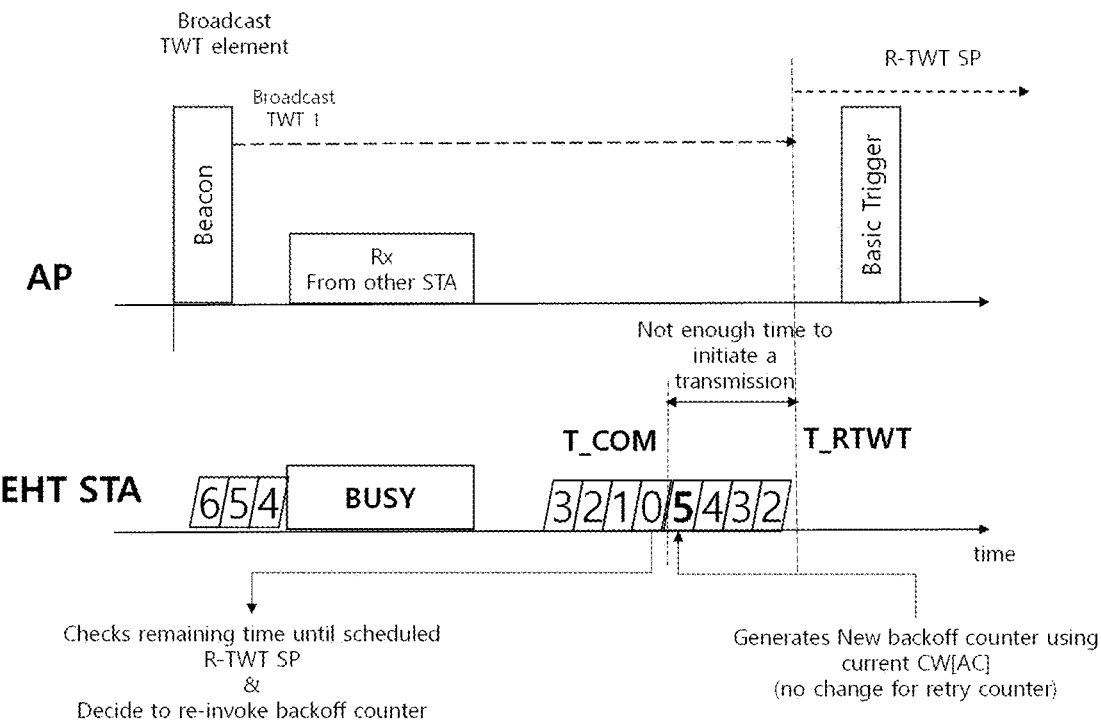
FIG. 14 illustrates a station re-performing a channel access procedure in consideration of a limited service period according to an embodiment of the disclosure.

A channel access procedure in consideration of the restricted service period is described through FIG. 14.

FIG. 14 illustrates re-performing a channel access procedure by a station in consideration of a restricted service period according to an embodiment of the disclosure.

As described above, even in a case where a station completes channel access before a restricted service period, when a frame exchange completion time point is after a start of the restricted service period, the station may start a channel access procedure again without performing transmission. In this case, the station may obtain a value of a backoff counter again. In this case, the station may use the size of a CW used for the immediately preceding channel access procedure without change. That is, the station may not double the size of the CW used for the immediately preceding channel access procedure, and may not initialize the size to the minimum value among values that the CW may have. In addition, the station may not increase the number of times of retry, for example, a QoS STA retry counter (QSRC).

In addition, when a time point at which the station completes the channel access is within a predetermined time from a start point of the restricted service period, the station may start the channel access procedure again without performing transmission.

In the embodiments above, the station which attempts to transmit low latency traffic may start frame exchange after the channel access even when a time point of completion of frame exchange is after the start of the restricted service period. Such an exception may be allowed only when the station which attempts to transmit low latency traffic is a station participating in the restricted TWT.

In addition, as described above, the station may operate as a NAV is configured in an AC of traffic other than low latency traffic. Accordingly, the station may determine that a CCA result for transmission of the AC of the traffic other than the low latency traffic is not idle (is busy).

In an embodiment of FIG. 14, an AP performs signaling of configuration of a restricted service period by transmitting a beacon frame including a TWT element. Before a start of the restricted service period, a value of a backoff counter of channel access of the station reaches 0. The station determines that a time point at which exchange of frames including traffic to be transmitted by the station is completed is after a start time point of the restricted service period. Accordingly, the station obtains a backoff counter within a CW value used for the immediately preceding channel access procedure. The station performs a channel access procedure again by using the obtained backoff counter. In this case, the station does not increase a retransmission counter.

Before the restricted service period ends, all low latency traffic transmission may be completed. In such a case, it may be inefficient that transmission of traffic other than the low latency traffic is restricted due to the low latency service period. Accordingly, a method of terminating the restricted service period early may be required. A description thereof will be made through an embodiment of FIG. 15.

Figure 15:
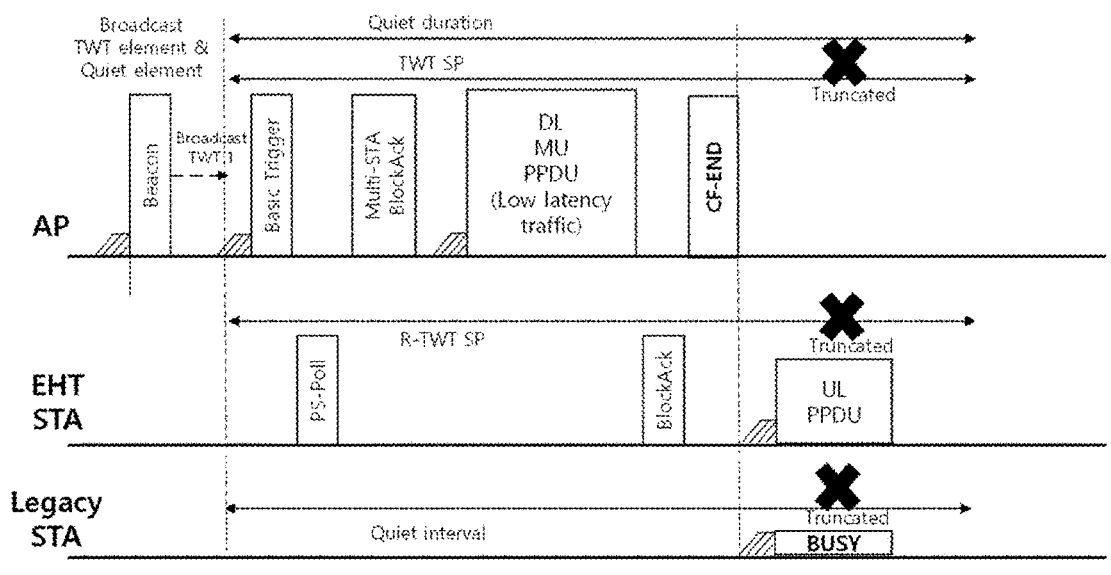
FIG. 15 illustrates an operation in which an AP early terminates a limited service period according to an embodiment of the disclosure.

FIG. 15 illustrates an operation of terminating a restricted service period early by an AP according to an embodiment of the disclosure.

For the AP to terminate the restricted service period early, the AP needs to determine that all low latency transmission of a station participating in a restricted TWT is completed. To this end, a station participating in a restricted TWT may perform signaling of whether to additionally transmit low latency traffic, through a transmitted frame. Specifically, the station may perform signaling of whether to additionally transmit low latency traffic by configuring a value of a more data subfield of a frame control field of a frame. In this case, when the value of the more data subfield of the frame control field of the frame transmitted in the restricted service period is 1, the more data subfield may indicate that additional transmission of low latency traffic is required and may not indicate whether additional transmission of traffic other than the low latency traffic is required. For example, when the station participating in the restricted TWT stores traffic other than low latency traffic in a transmission buffer, without storing the low latency traffic, the station may configure the value of the more data subfield of the frame control field of the frame transmitted by the station in the restricted service period as 0. The AP may terminate the restricted service period early based on whether the value of the more data subfield of the frame control field of the frame transmitted in the restricted service period by the station participating in the restricted TWT is not 0. Specifically, when the transmission buffer of the AP has no low latency traffic to be transmitted and the value of the more data subfield of the frame control field of the frame transmitted in the restricted service period by the station participating in the restricted TWT is not 0, the AP may terminate the restricted service period early.

The AP may terminate the restricted service period early by transmitting a predetermined control frame. In this case, the control frame may be a CF-End frame. In this case, the AP may configure a BSSID(TA) field of the CF-End frame as a MAC address or a BSSID of the AP. In addition, the AP may configure an individual/group bit of the BSSID(TA) field of the CF-End frame as 1. In another specific embodiment, the AP may terminate the restricted service period early by transmitting a predetermined management frame.

The station having received, in the restricted service period, a predetermined frame indicating termination of the restricted service period may determine that the restricted service period has been terminated. In this case, the station having received the predetermined frame may resume channel access without restriction applied to the restricted service period. As describe above, the predetermined frame may be a CF-End frame. In this case, a value of a TA(BSSID) field of the CF-End frame received by the station in the restricted service period is a MAC address of an AP with which the station is associated, the station may determine the frame as a CF-End frame for terminating the restricted service period.

As described above, to protect the restricted service period from the legacy wireless communication terminal, a quiet interval for the restricted service period may be configured. In this case, the AP may transmit the CF-End frame to terminate the restricted service period. This is because when the AP transmits the CF-End frame, the quiet interval configured for the legacy station may be also released.

In the above-described embodiments, the CF-End frame may be a frame having the type of a frame control field, which corresponds to a control frame (type value B3 B2==01), and having the subtype corresponding to a CF-End frame (subtype value B7 B6 B4 B4=1110).

When the quiet interval is configured for the restricted service period, the station participating in the restricted TWT may not be allowed to transmit the CF-End frame in the restricted service period. In a specific embodiment, the station participating in the restricted TWT may not be allowed to transmit the CF-End frame in the quiet interval corresponding to the restricted service period. This is because a NAV configured in the legacy station is released when the station participating in the restricted TWT transmits the CF-End frame. However, as described above, when the CF-End frame is used to terminate the restricted service period early, the AP may transmit the CF-End frame within the restricted service period.

In an embodiment of FIG. 15, an AP transmits a beacon frame including a TWT element and a quiet element. A station supporting a restricted TWT determines that a restricted service period is configured, and a station not supporting the restricted TWT determines that a quiet interval is configured. When the AP determines that all low latency traffic transmission is completed within the restricted service period, the AP terminates the restricted service period early by transmitting the CF-End frame, and releases the quiet interval configured for the legacy station. In this case, the station supporting the restricted TWT determines that channel access restriction applied during the restricted service period has been removed. Specifically, as described above, when an embodiment in which a NAV is configured during the restricted service period is applied, the station supporting the restricted TWT may determine that the NAV for the restricted service period has been released. In addition, the station not supporting the restricted TWT, which has received the CF-End frame, releases the NAV.

As described above, each station included in the multi-link device may perform association with another station. Accordingly, each station included in the multi-link device may operate an individual TWT service period. That is, an individual TWT service period may be operated in each of the multiple links in which the multi-link device operates. As such, an individual TWT agreement may be necessary to operate the individual TWT service period. To this end, a station of the multi-link device may transmit a TWT request frame and a station having received the TWT request frame may transmit a TWT response frame. The TWT request frame may include a frame of which a TWT setup frame has a command field value of 0-2. Furthermore, the TWT response frame may include a frame of which a TWT setup frame has a command field value of 3-7. The specific TWT agreement method may be identical to that defined in IEEE 802.11ax.

The station may save power through a TWT operation. Accordingly, to increase power saving efficiency, the multi-link device may set the TWT service period on the multiple links in which the multi-link device operates. For example, the multi-link device including a first station and a second station may set a TWT service period in a first link in which the first station operates and a second link in which the second station operates and synchronize operation states (an awake state or a doze state) of the first station and the second station. Here, the first station may transmit a TWT request frame to a first AP to which the first station is associated and the second station may transmit a TWT request frame to a second AP to which the second station is associated. Here, the TWT request frame transmitted by the first station and the TWT request frame transmitted by the second station may indicate the same TWT parameter value. Accordingly, individual transmission of the TWT request frame in the multiple links may degrade the transmission efficiency. In a specific embodiment of the disclosure, the TWT request frame transmitted through a single link may perform the TWT agreement for the multiple links. A description thereof will be given with reference to FIG. 16.

FIG. 16 illustrates a format of a TWT element according to an embodiment of the disclosure.

The TWT request frame for the TWT agreement performed in the multiple links may be transmitted through the first link. Here, the TWT request frame may include a TWT parameter for the TWT operation performed in the multiple links. Furthermore, the TWT request frame for the TWT agreement performed in the second link may be transmitted through the first link. Here, the TWT request frame may include a TWT parameter for the TWT operation performed in the second link. For example, in case that the multi-link device includes the first station operating in the first link and the second station operating in the second link, the first station may set the TWT agreement for the second station. Here, in case that the first station is associated to the first AP, the second station is associated to the second AP, and the first AP and the second AP are included in a single multi-link device, the first station may set the TWT agreement with the first AP. This is because stations included in the multi-link device may share a partial function or partial information of the MAC layer. A TWT element having a new format may be necessary for the TWT agreement operation described above.

Specifically, the TWT element may include information for the link in which the TWT agreement is performed. Here, the information for the link may include information for an ID of the link operated by the AP. In a specific embodiment, the TWT element may indicate the multiple links in which the TWT agreement is performed. For example, the information for the link may correspond to a bitmap. Here, each bit of the bitmap may indicate whether the TWT element is performed in each of the multiple links. The station may transmit the TWT element to perform the TWT agreement on the multiple links.

The bitmap described above may be referred to as a Link identifier (ID) bitmap. The link ID bitmap may have a size of two octets. For example, in case that the link ID bitmap has a value of 1110 0000 0000 0000 2b, the link ID bitmap may indicate TWT negotiation for the first link corresponding to the first bit, the second link corresponding to a second bit, and a third link corresponding to a third bit. In these embodiments, a link element including information for a TWT parameter for links other than the link on which the link element is transmitted may be transmitted. Furthermore, in these embodiments, a single link element may be transmitted for the TWT agreement performed on the multiple links.

The TWT element may include a TWT Flow ID indicating an identifier applied to the TWT agreement. In case that the TWT element is for the TWT agreement performed on the multiple links, the TWT Flow ID included in the TWT element may corresponds to a value not used for TWT agreements of all links in which the TWT element may perform a TWT agreement. In another specific embodiment, in case that the TWT element is for performing the TWT agreement performed in the multiple links, the TWT element may include a field for indicating multiple TWT Flow IDs. For example, in case that the TWT element is for performing the TWT agreement performed in the multiple links, the TWT element may include multiple subfields for indicating respective multiple TWT Flow IDs. Here, the multiple subfields may correspond to the multiple links in which the TWT element performs the TWT agreement, respectively. In these embodiments, TWT Flow IDs not used for a link corresponding to each subfield may be used. Furthermore, in case that the TWT element is to change the TWT agreement of the link corresponding to the subfield, the TWT Flow ID having been used by the link corresponding to the subfield may be used for the subfield. This is because there is an existing TWT agreement for which the TWT Flow ID is used. Accordingly, when the station performs a new TWT agreement, the station may be delimited as to use, for a TWT agreement, a TWT Flow ID not corresponding to the TWT Flow ID of the existing TWT agreement. Here, in case that the station is to change the existing TWT agreement, the station may use a TWT Flow ID corresponding to the TWT agreement to be changed for a TWT agreement.

(a) of FIG. 16 illustrates a format of a TWT element according to an embodiment of the disclosure. The TWT element may include an element ID field, a length field, a Control field, and a TWT parameter information field. Here, it is indicated that an element including the element ID field is the TWT element. The element ID field may have a value of 216.

(b) of FIG. 16 illustrates a specific format of the Control field of the TWT element. The Control field includes an NDP paging indicator field, a responder PM mode field, a negotiation type field, a TWT information frame disabled field, a wake duration unit field, a link ID bitmap present field, and a reserved field. (b) of FIG. 16 additionally includes a link ID bitmap present field compared to the TWT element defined in IEEE 802.11ax. Here, the link ID bitmap present field indicates whether the TWT element includes the above-described link ID bitmap. Specifically, when the link ID bitmap present field has a value of 1, the TWT element may include the link ID bitmap, and when the link ID bitmap present field has a value of 0, the TWT element may not include the link ID bitmap. The station having received the TWT element may determine whether the TWT element includes the link ID bitmap on the basis of the value of the link ID bitmap present field.

(c) of FIG. 16 illustrates a format of an Individual TWT Parameter Set field included in the TWT element. The Individual TWT Parameter Set field included in the TWT element may include a Request Type field, a Target Wake Time field, a TWT Group Assignment field, a Nominal Minimum TWT wake Duration field, a TWT Wake Interval Mantissa field, a TWT Channel field, an NDP Paging field, and a Link ID Bitmap field. (b) of FIG. 16 additionally includes a Link ID Bitmap field compared to the Individual TWT Parameter Set field defined in IEEE 802.11ax. In case that the TWT elements includes the Link ID Bitmap field, the TWT element may indicate requesting a TWT request for a link indicated by the Link ID Bitmap field. When the TWT element included in the TWT request frame is included, and the TWT element includes Link ID Bitmap field, the station having received the TWT request frame may determine that the TWT request frame requests the TWT agreement for the link indicated by the Link ID Bitmap field.

(d) of FIG. 16 illustrates a Request Type field of the TWT element according to an embodiment of the disclosure. The Request Type field of the TWT element may include a TWT request field, a TWT Setup Command field, a Trigger field, an Implicit field, a Flow Type field, a TWT Flow Identifier field, a TWT Wake Interval Exponent field, and TWT protection field. The TWT Flow Identifier field indicates a TWT Flow ID for identifying the TWT agreement performed by the TWT request frame included in the TWT element. Here, the TWT Flow ID may be determined according to the embodiments described above.

Figure 17:
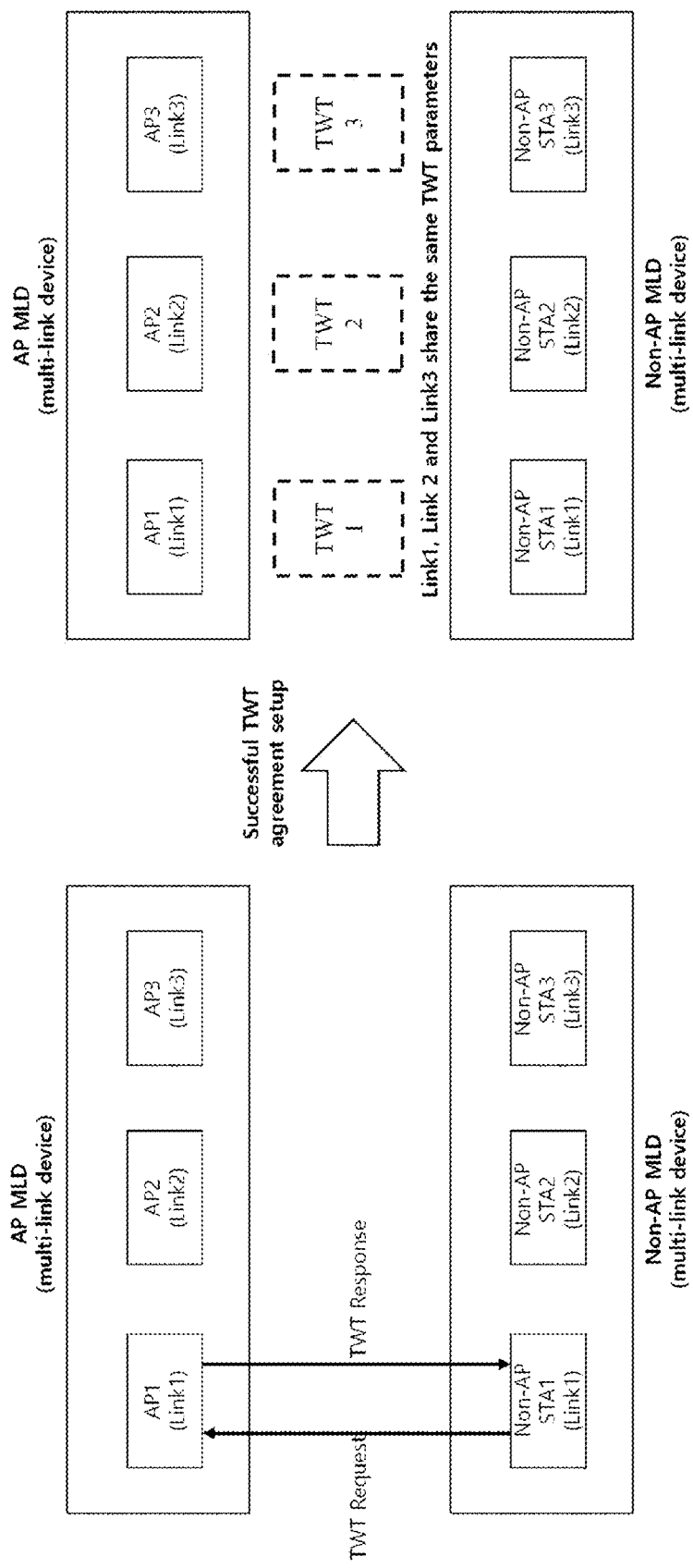
FIG. 17 illustrates a multi-link device performing a TWT agreement according to an embodiment of the disclosure.

FIG. 17 illustrates a multi-link device performing a TWT agreement according to an embodiment of the disclosure.

The AP multi-link device includes a first AP AP1, a second AP AP2, and a third AP AP3. A non-AP multi-link device includes a first station STA1, a second station STA2, and a third station STA3. The first AP AP1, the second AP AP2, and the third AP AP3 operate in a first link Link1, a second link Link2, and a third link Link3, respectively. The first station STA1, the second station STA2, and the third station STA3 operate in the first link Link1, the second link Link2, and the third link Link3, respectively. The non-AP multi-link device may transmit a TWT request frame for performing the TWT agreement on the first link Link1 to third link Link3. Here, the TWT request frame may include a single TWT element. Specifically, in case that the non-AP multi-link device is to operate a TWT service period for which the same TWT parameter is used, the TWT request frame may include a single TWT element.

Specifically, the TWT element may indicate a start time point and a termination time point of the TWT service period. In addition, the TWT element may include the link ID bitmap described with reference to FIG. 16. Specifically, the TWT element may indicate the first link Link1, the second link Link2, and the third link Link3 in a Link ID Bitmap subfield.

Since the Link ID Bitmap subfield of the TWT element of the received TWT request frame indicates the first link Link1, the second link Link2, and the third link Link3, the AP multi-link device may determine that the TWT parameter signaling the TWT request frame is about the TWT service period of the first link Link1, the second link Link2, and the third link Link3.

The AP multi-link device may transmit a TWT response frame to the non-AP multi-link device to accept the TWT setup. Here, the TWT agreement is established on each of the first link Link1 to third link Link3. The TWT agreement on each link may indicate a TWT agreement between the first station STA1 and the first AP AP1, a TWT agreement between the second station STA2 and the second AP AP2, and a TWT agreement between the third station STA3 and the third AP AP3.

Figure 18:
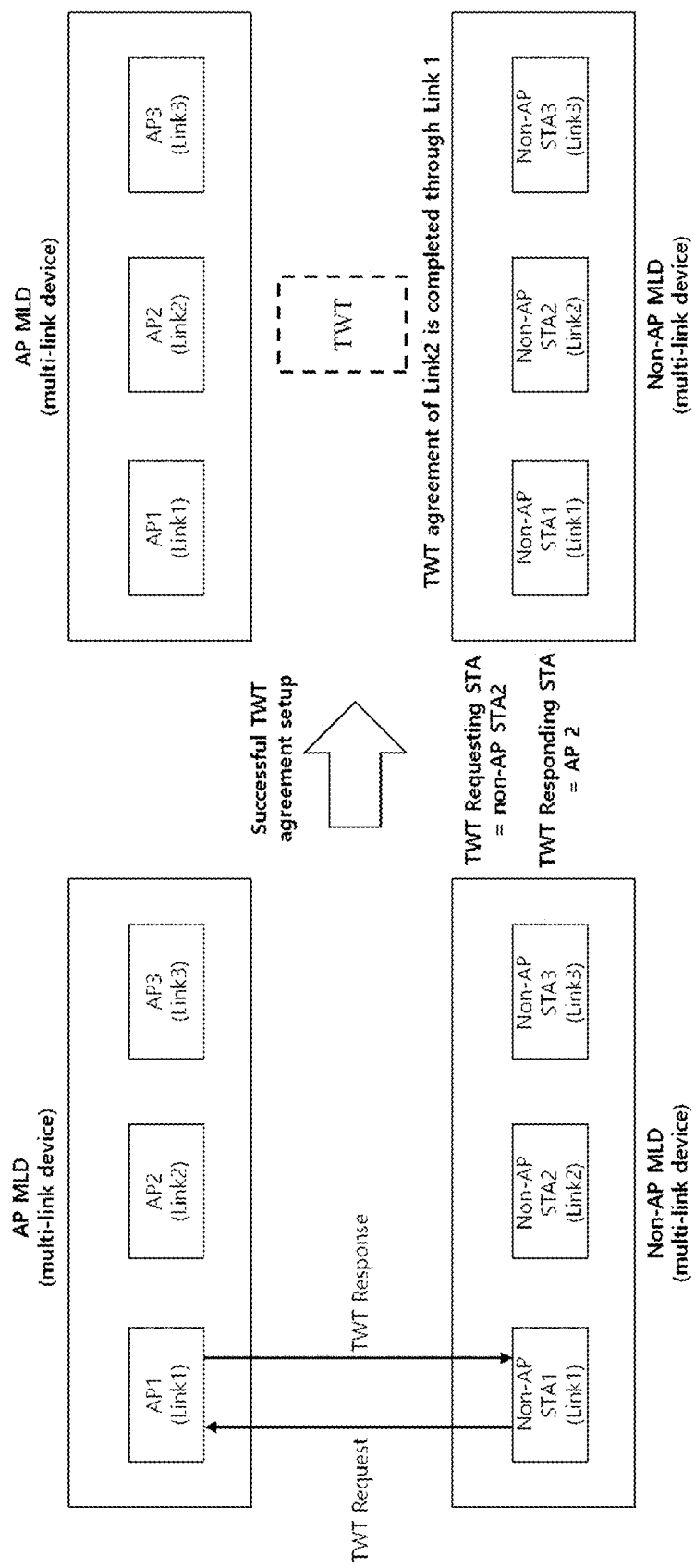
FIG. 18 illustrates a station included in a multi-link device performing a TWT agreement for another station included in the multi-link device including the station according to an embodiment of the disclosure.

FIG. 18 illustrates a station included in a multi-link device performing a TWT agreement for another station included in the multi-link device including the station according to an embodiment of the disclosure.

As described above, the TWT request frame for the TWT agreement performed in the second link may be transmitted through the first link. To this end, the first station operating in the first link may transmit the TWT request frame on the first link. Here, the TWT element of the TWT request frame may include the TWT Link ID bitmap and the TWT Link ID bitmap may indicate the second link. The first AP operating in the first link may determine, on the basis of the TWT Link ID bitmap, that the TWT request frame is transmitted for the TWT agreement in the second link.

In the embodiment of FIG. 18, the AP multi-link device includes the first AP AP1 and the second AP AP2. The non-AP multi-link device includes the first station STA1 and the second station STA2. The first AP AP1 and the second AP AP2 operate in the first link Link1 and the second link Link2, respectively. The first station STA1 and the second station STA2 operate in the first link Link1 and the second link Link2, respectively. The first station STA1 transmits the TWT request frame for the TWT agreement in the second link Link 2 through the first link Link1. The first AP AP1 transmits the TWT response frame to the first station STA1 and accepts the TWT agreement in the second link Link2. Accordingly, the TWT agreement between the second station STA2 and the second AP AP2 is set.

In this case, a station transmitting the TWT request frame and a station to which the TWT agreement is applied may be different from each other. Furthermore, as described above, although a single station transmits the TWT request frame, the TWT agreement may be applied to multiple stations. Accordingly, a station capable of tearing down the TWT agreement may be problematic.

In a conventional TWT operation, a TWT Flow ID of 3-bit and MAC addresses of two stations establishing the TWT agreement may be used for identifying the TWT agreement. Specifically, the TWT agreement may be identified through an MAC address of a TWT request station, an MAC address of a TWT response station, and the TWT Flow ID. In relation to the TWT agreement set by the multi-link device, since the station performing the TWT agreement and the station to which the TWT agreement is applied may be different from each other as described above, it may be difficult to identify the TWT agreement. For example, in the embodiments of FIGS. 17 and 18, the TWT request station is the first station and the TWT response station is the first AP. However, in the embodiment of FIG. 17, the TWT agreement is applied to the first station and the first AP, the second station and the second AP, and the third station and the third AP. In the embodiment of FIG. 18, the TWT agreement is applied to the second station and the second AP. In addition, in the embodiment of FIG. 17, a single TWT Flow ID may be applied identically to the first station and the first AP, the second station and the second AP, and the third station and the third AP. Therefore, the TWT agreement may not be identified. To address the issue, following embodiments may be applied.

A station capable of tearing down the TWT agreement may correspond to a station to which the TWT agreement is applied. To this end, the TWT request station may be a station operating in a link to which the TWT agreement is applied, rather than a station transmitting the TWT request frame. Specifically, the TWT request station may be a station operating in a link to which the TWT agreement is applied among stations of the multi-link device, which transmit the TWT request frame. Furthermore, the TWT response station may be a station operating in a link to which the TWT agreement is applied, rather than a station transmitting the TWT response frame. Specifically, the TWT response station may be a station operating in a link to which the TWT agreement is applied among stations of the multi-link device, which transmit the TWT response frame.

Following embodiments below may be applied as a method for identifying the TWT agreement.

In a specific embodiment, the TWT agreement may be identified on the basis of an ID of a link. Specifically, the TWT agreement may be identified on the basis of a TWT Flow ID, an MAC address of the TWT request station, an MAC address of the TWT response station, and an ID of a link to which the TWT agreement is applied. In the embodiment of FIG. 17, a first TWT agreement corresponding to the TWT agreement set between the first station and the first AP may be identified on the basis of a TWT Flow ID, an MAC address of the first station, an MAC address of the first AP, and an ID of the first link. A second TWT agreement corresponding to the TWT agreement set between the second station and the second AP may be identified on the basis of the TWT Flow ID, the MAC address of the first station, the MAC address of the first AP, and an ID of the second link. A third TWT agreement corresponding to the TWT agreement set between the third station and the third AP may be identified on the basis of the TWT Flow ID, the MAC address of the first station, the MAC address of the first AP, and an ID of the third link. According to a specific embodiment, the TWT Flow ID may be set for each link.

Furthermore, the TWT agreement may be considered to be performed for each multi-link device. Accordingly, to identify the TWT agreement, an MAC address of the TWT request multi-link device instead of the MAC address of the TWT request station and an MAC address of the TWT response multi-link device instead of the MAC address of the TWT response station may be used. In the embodiment of FIG. 17, the first TWT agreement corresponding to the TWT agreement set between the first station and the first AP may be identified on the basis of the TWT Flow ID, an MAC address of the non-AP multi-link device, an MAC address of the AP multi-link device, and the ID of the first link. The second TWT agreement corresponding to the TWT agreement set between the second station and the second AP may be identified on the basis of the TWT Flow ID, an MAC address of the non-AP multi-link device, an MAC address of the AP multi-link device, and the ID of the second link. The third TWT agreement corresponding to the TWT agreement set between the third station and the third AP may be identified on the basis of the TWT Flow ID, an MAC address of the non-AP multi-link device, an MAC address of the AP multi-link device, and the ID of the third link. According to a specific embodiment, the TWT Flow ID may be set for each link. According to a specific embodiment, the TWT Flow ID may be set for each link.

In addition, the TWT request station may be a station operating in a link to which the TWT agreement is applied, rather than a station transmitting the TWT request frame. Specifically, the TWT request station may be a station operating in a link to which the TWT agreement is applied among stations of the multi-link device, which transmit the TWT request frame. Furthermore, the TWT response station may be a station operating in a link to which the TWT agreement is applied, rather than a station transmitting the TWT response frame. Specifically, the TWT response station may be a station operating in a link to which the TWT agreement is applied among stations of the multi-link device, which transmit the TWT response frame. In the embodiment of FIG. 17, the first TWT agreement corresponding to the TWT agreement set between the first station and the first AP may be identified on the basis of the TWT Flow ID, the MAC address of the first station, and the MAC address of the first AP. The second TWT agreement corresponding to the TWT agreement set between the second station and the second AP may be identified on the basis of the TWT Flow ID, the MAC address of the second station, and the MAC address of the second AP. The third TWT agreement corresponding to the TWT agreement set between the third station and the third AP may be identified on the basis of the TWT Flow ID, the MAC address of the third station, and the MAC address of the third AP. According to a specific embodiment, the TWT Flow ID may be set for each link.

In addition, the TWT agreement may be identified on the basis of the link through which the TWT request frame is transmitted. Specifically, the TWT agreement may be identified on the basis of a TWT Flow ID, an MAC address of the TWT request station, an MAC address of the TWT response station, and an ID of a link through which the TWT request frame is transmitted. In the embodiment of FIG. 17, a first TWT agreement corresponding to the TWT agreement set between the first station and the first AP may be identified on the basis of a TWT Flow ID, an MAC address of the first station, an MAC address of the first AP, and the ID of the first link. The second TWT agreement corresponding to the TWT agreement set between the second station and the second AP may be identified on the basis of the TWT Flow ID, the MAC address of the first station, the MAC address of the first AP, and the ID of the first link. The third TWT agreement corresponding to the TWT agreement set between the third station and the third AP may be identified on the basis of the TWT Flow ID, the MAC address of the first station, the MAC address of the first AP, and the ID of the first link. According to a specific embodiment, the TWT Flow ID may be set for each link.

The method in which the multi-link device sets the TWT agreement is described above. A method in which the multi-link device tears down the TWT agreement will be described with reference to FIG. 19.

Figure 19:
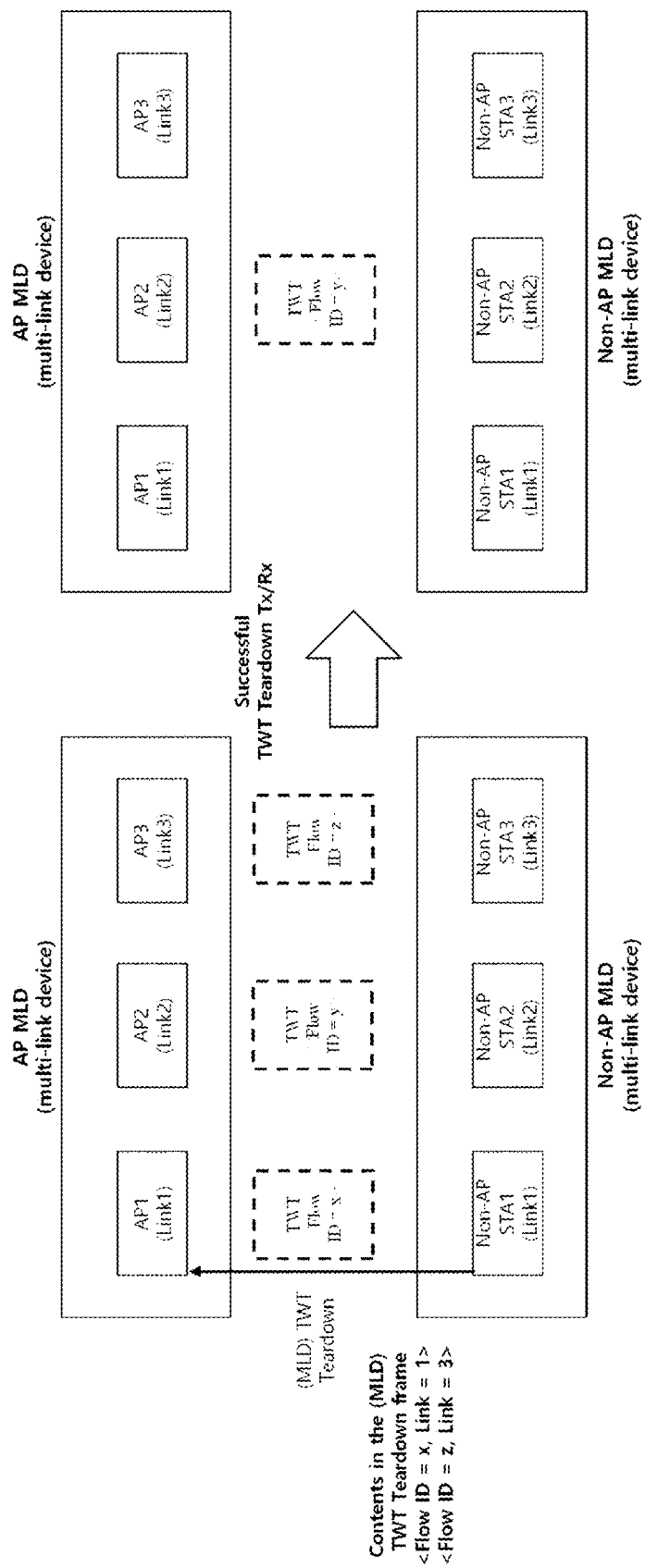
FIG. 19 illustrates a multi-link device tearing down a TWT agreement according to an embodiment of the disclosure.

FIG. 19 illustrates a multi-link device tearing down a TWT agreement according to an embodiment of the disclosure.

In an embodiment of the disclosure, the multi-link device may tear down, on one link, the TWT agreement applied to multiple links. In a conventional wireless LAN, a station transmits a TWT teardown frame to tear down the TWT agreement. Here, the TWT teardown frame may be transmitted by the TWT request station or the TWT response station. The TWT teardown frame includes the TWT Flow Identifier field indicating the TWT Flow ID. Here, the TWT Flow Identifier field may correspond to a field of 3-bit. In case that the station to which the TWT agreement is applied receives the TWT teardown frame, the station may tear down the TWT agreement corresponding to the TWT Flow ID indicated by the TWT teardown frame. In case that the TWT teardown frame is successfully transmitted, the station having transmitted the TWT teardown frame may tear down the TWT agreement corresponding to the TWT Flow ID indicated by the TWT teardown frame. Accordingly, the station to tear down the TWT agreement and the TWT agreement to be torn down may be identified on the basis of an MAC address of a TWT teardown frame transmitter, an MAC address of a TWT teardown receiver, and the TWT Flow ID.

However, as described above, in case that the TWT agreement is established to the station of the multi-link device, the station transmitting the TWT request frame and the station to which the TWT agreement is applied may be different from each other. Furthermore, as described above, although a single station transmits the TWT request frame, the TWT agreement may be applied to multiple stations. Accordingly, a method for tearing down the TWT agreement, which may be applied even in this case, is needed.

The TWT teardown frame may include information on an identifier of a link. Here, the station of the multi-link device may tear down at least one of multiple TWT agreements on the basis of the identifier of the link, that is, the link ID indicated by the TWT teardown frame. Specifically, in case that the station of the multi-link device operates in the first link and the station tears down the TWT agreement performed on the second link, the station may transmit the TWT teardown frame including information on the identifier of the link through the first link. In these embodiments, the identifier of the link may correspond to an identifier of a link to which the TWT agreement to be torn down is applied. For example, the TWT teardown frame may include a TWT Flow Identifier field indicating the TWT Flow ID and a link ID field indicating the identifier of the link to which the TWT agreement to be torn down is applied. In addition, the TWT teardown frame may include one link ID field. In addition, the TWT teardown frame may include multiple link ID fields. To this end, the format of the TWT teardown frame transmitted by the station included in the multi-link device may be different from the format of the TWT teardown frame transmitted by the station not included in the multi-link device. In another specific embodiment, the format of the TWT teardown frame transmitted by the station included in the multi-link device may be identical to the format of the TWT teardown frame transmitted by the station not included in the multi-link device.

In case that a first multi-link device transmits the TWT teardown frame to a second multi-link device through the first link, and the second multi-link device receives the TWT teardown frame successfully, a TWT agreement corresponding to the TWT Flow ID indicated by the TWT teardown frame among TWT agreements established between the first multi-link device and the second multi-link device may be torn down in the first multi-link device and the second multi-link device. Here, the first multi-link device and the second multi-link device may tear down the TWT agreement corresponding to information related to the link indicated by the TWT teardown frame among TWT agreements established between the first multi-link device and the second multi-link device. Specifically, the first multi-link device and the second multi-link device may tear down the TWT agreement corresponding to information related to the TWT Flow ID indicated by the TWT teardown frame and the link indicated by the TWT teardown frame among TWT agreements established between the first multi-link device and the second multi-link device.

In another specific embodiment, in case that a first multi-link device transmits the TWT teardown frame to a second multi-link device through the first link, and the second multi-link device receives the TWT teardown frame successfully, the first multi-link device and the second multi-link device may tear down the TWT agreement corresponding to the MAC address of the station transmitting the TWT teardown frame and the MAC address of the station receiving the TWT teardown frame. In another specific embodiment, in case that a first multi-link device transmits the TWT teardown frame to a second multi-link device through the first link, and the second multi-link device receives the TWT teardown frame successfully, the first multi-link device and the second multi-link device may tear down the TWT agreement corresponding to the MAC address of the station performing the TWT agreement and the MAC address of the station performing the TWT agreement among TWT agreements established between the first multi-link device and the second multi-link device. In another specific embodiment, the station receiving the TWT teardown frame and the station transmitting the TWT teardown frame may tear down the TWT agreement corresponding to the TWT Flow ID indicated by the TWT teardown frame within the link in which the stations operate.

In addition, in case that the TWT agreement is set in multiple links by a single TWT element, the TWT agreement set in the multiple links may be torn down by the one TWT teardown frame. Here, the TWT parameter of the TWT agreement set in the multiple links may be the same. In addition, the TWT Flow ID of the TWT agreement set in the multiple links may be the same. For example, in case that a TWT agreement is established between the first multi-link device and the second multi-link device at one time, for example, by a single TWT element, on the first link to the third link, the first multi-link device or the second multi-link device may transmit a TWT teardown frame to one of the first link to third link to tear down the TWT agreement established on the first link to third link.

The AP multi-link device includes a first AP AP1, a second AP AP2, and a third AP AP3. A non-AP multi-link device includes a first station non-AP STA1, a second station non-AP STA2, and a third station non-AP STA3. The first AP AP1, the second AP AP2, and the third AP AP3 operate in a first link Link1, a second link Link2, and a third link Link3, respectively. The first station non-AP STA1, the second station non-AP STA2, and the third station non-AP STA3 operate in the first link Link1, the second link Link2, and the third link Link3, respectively. The first station non-AP STA1 is associated to the first AP AP1, the second station non-AP STA2 is associated to the second AP AP2, and the third station non-AP STA3 is associated to the third AP AP3. A TWT agreement is established between the first station non-AP STA1 and the first AP AP1, and a TWT Flow ID of the TWT agreement is x. A TWT agreement is established between the second station non-AP STA2 and the second AP AP2, and a TWT Flow ID of the TWT agreement is y. A TWT agreement is established between the third station non-AP STA3 and the third AP AP3, and a TWT Flow ID of the TWT agreement is z.

Here, the non-AP multi-link device transmit a TWT teardown frame to tear down the TWT agreement between the first station non-AP STA1 and the first AP AP1 and the TWT agreement between the third station non-AP STA3 and the third AP AP3. Here, the TWT teardown frame indicates x corresponding to the TWT Flow ID of the TWT agreement between the first station non-AP STA1 and the first AP AP1 and z corresponding to the TWT Flow ID of the TWT agreement between the third station non-AP STA3 and the third AP AP3.

The AP multi-link device transmits ACK for the TWT teardown frame to the non-AP multi-link device. Thereafter, the AP multi-link device tears down the TWT agreement between the first station non-AP STA1 and the first AP AP1 and the TWT agreement between the third station non-AP STA3 and the third AP AP3. The non-AP multi-link device receives ACK for the TWT teardown frame. Thereafter, the non-AP multi-link device tears down the TWT agreement between the first station non-AP STA1 and the first AP AP1 and the TWT agreement between the third station non-AP STA3 and the third AP AP3.

According to the embodiments described above, a description of the TWT element for setup and teardown of the TWT agreement will be given with reference to FIG. 20.

FIG. 20 illustrates a format of an Individual TWT Parameter Set field of a TWT element according to an embodiment of the disclosure.

A Request Type field of an Individual TWT Parameter Set field of the TWT element includes a TWT request subfield, which is a 1-bit field, a TWT setup command subfield, which is a 3-bit field, a trigger subfield, which is a 1-bit field, an implicit subfield, which is a 1-bit field, a Flow Type subfield, which is a 1-bit field, a TWT Flow Identifier subfield, which is a 3-bit field, a TWT wake interval exponent subfield, which is a field, and a TWT protection subfield, which is a 1-bit field.

In case that the TWT request subfield has a value of 1, the station transmitting the TWT element may correspond to a TWT request station or a TWT scheduled station. In addition, in case that the TWT request subfield has a value of 0, the station transmitting the TWT element may correspond to a TWT response station or a TWT scheduling AP.

The TWT setup command subfield may indicate a type of a TWT command. The TWT setup command subfield may be configured to have a value of 0 to 7. In case that the TWT setup command subfield has a value of 0 to 7, the TWT setup command subfield may indicate that the TWT element including the TWT setup command subfield is a request TWT, a suggest TWT, a demand TWT, TWT grouping, an accept TWT, an alternate TWT, a dictate TWT, and a reject TWT. This may be the same as a configuration of a conventionally used TWT setup command subfield.

In case that the trigger subfield has a value of 1, the trigger subfield may indicate that one or more trigger frames are transmitted through a TWT service period when a TWT agreement is established by the TWT element.

The implicit subfield indicates whether the TWT element implicitly requests a TWT. In case that the implicit subfield has a value of 1, the implicit subfield may indicate that the TWT element implicitly requests a TWT. In case that the implicit subfield has a value of 0, the implicit subfield may indicate that the TWT element explicitly requests a TWT.

The Flow Type subfield indicates an interaction method between the TWT request station and the TWT response station within the TWT service period. The value of the Flow Type subfield may be set to be the same as a value of a Flow Type subfield defined in a conventional wireless LAN standard.

The TWT Flow Identifier subfield indicates an ID value for distinguishing the TWT agreement. A TWT element in the conventional wireless LAN standard includes only one TWT Flow Identifier subfield. However, in case that the TWT agreement is set for multiple links through a single TWT element as described above, the TWT element may include multiple TWT Flow Identifier subfields. Here, each of the multiple TWT Flow Identifier subfields may indicate the TWT Flow ID of the TWT agreement set for each of multiple links.

The TWT wake interval subfield indicates an average interval between TWT service periods set by the TWT element. Here, the average interval is a predicted value. The value of the TWT wake interval subfield may be set to be the same as a value defined in a conventional wireless LAN standard.

In case that the TWT protection subfield has a value of 1, the TWT protection subfield indicates that the TWT request station requests protection for the TWT service period from the TWT response station. Here, a protection method for the TWT service period may be the same as that defined in the conventional wireless LAN standard.

The Target Wake Time field, the TWT Group Assignment field, the Nominal Minimum TWT wake Duration field, the TWT Wake Interval Mantissa field, the TWT Channel field, and the NDP Paging field included in the Individual TWT Parameter Set field may be the same as those defined in the conventional wireless LAN standard.

The Individual TWT Parameter Set field may include the Link ID Bitmap subfield as described through FIG. 16 above. In case that the Link ID Bitmap subfield indicates multiple links, the TWT element may request the TWT agreement through multiple links. Here, in case that the TWT agreement is established on multiple links, TWT service periods having the same parameter may be applied to the multiple links.

In addition, even in case that the TWT agreement is set for multiple links through a single TWT element, multiple TWT agreements set for the multiple links may have different TWT Flow IDs. This is because even if the TWT agreement is established at once, the TWT agreement is applied to different links and to different stations and APs. The TWT element may include multiple TWT flow identifiers. Specifically, the TWT element may include multiple TWT Flow Identifier fields respectively corresponding to multiple links to which the TWT agreement is applied. In this case, the number of TWT Flow Identifier fields included in the TWT element may be the same as the number of links indicated by the Link ID Bitmap subfield. For example, if the Link ID Bitmap subfield indicates two links, the TWT element included in the Link ID Bitmap subfield may include two TWT Flow Identifier fields. Among the multiple TWT Flow Identifier fields included in the TWT element, a first TWT Flow Identifier subfield may correspond to the TWT Flow ID included in the Request Type field. Remaining subfields other than the first TWT Flow Identifier subfield may be included in a separate field of the TWT element like the Additional TWT Flow ID field in FIG. 20. In addition, the first TWT Flow Identifier subfield may indicate the TWT Flow ID of the TWT agreement established on a link through which the TWT request frame is transmitted. Remaining TWT Flow Identifier subfields other than the first TWT Flow Identifier subfield may indicate TWT Flow IDs of TWT agreements established on remaining links other than the link through which the TWT request frame is transmitted among links on which TWT agreements are established. As described above, remaining links other than the link through which the TWT request frame is transmitted among links on which TWT agreements are established may be indicated by the Link ID Bitmap subfield. In addition, remaining TWT Flow Identifier subfields other than the first TWT Flow Identifier subfield may be mapped to links according to the size order of link ID values. Among remaining TWT Flow Identifier subfields other than the first TWT Flow Identifier subfield, a first subfield may be mapped to a link having a link ID of smallest value among remaining links other than the link through which the TWT request frame is transmitted, a second subfield may be mapped to a link having a link ID of second smallest value among remaining links other than the link through which the TWT request frame is transmitted, and a third subfield may be mapped to a link having a link ID of third smallest value among remaining links other than the link through which the TWT request frame is transmitted.

In case that the TWT element requests a single TWT agreement, the TWT element may not include remaining TWT Flow Identifier subfields other than the first TWT Flow Identifier subfield. In case that the TWT element requests a TWT agreement in a single link other than the link through which the TWT request frame is transmitted, the TWT element may not include remaining TWT Flow Identifier subfields other than the first TWT Flow Identifier subfield. Here, the first TWT Flow Identifier subfield may indicate the TWT Flow ID corresponding to the TWT agreement requested by the TWT request frame.

FIG. 21 illustrates formats of remaining TWT Flow Identifier subfields excluding a first TWT Flow Identifier subfield according to an embodiment of the disclosure.

As described above, the size of the Additional TWT Flow ID field may be determined according to the number of links indicated by the link ID bitmap of the TWT element. In the conventional wireless LAN, the maximum number of TWT agreements that a station may establish is 8. Accordingly, in the conventional wireless LAN, the TWT Flow Identifier subfield is a 3-bit field. In case that the maximum number of TWT agreements that the multi-link device may establish is 8, the TWT Flow Identifier subfield may be a 3-bit field. In addition, the Additional TWT Flow ID field may include one or more subfields having a size of 3-bit. When the TWT element requests n TWT agreements, the Additional TWT Flow ID field may include n–1 subfields of 3-bit. As described above, the first TWT Flow Identifier subfield may correspond to the TWT Flow ID included in the Request Type field. In another specific embodiment, when the TWT element requests n TWT agreements, the Additional TWT Flow ID field may include n subfields of 3-bit. In addition, a reserved field may be included in the Additional TWT Flow ID field to make the TWT parameter set field have a length in octets. (a) of FIG. 21 illustrates this embodiment.

In a per-octet format of (a) of FIG. 21, the Additional TWT Flow ID field includes two TWT Flow ID subfields in 1 octet. Specifically, in case that the TWT element requests three TWT agreements, the Additional TWT Flow ID field may include two TWT Flow ID subfields in 1 octet.

In addition, in case that the Additional TWT Flow ID field indicates an odd number of TWT Flow IDs, a last octet included in the Additional TWT Flow ID field may indicate one TWT Flow ID and remaining 5 bits may be configured as reserved fields. (b) of FIG. 22 illustrates this embodiment.

Although the TWT Flow ID subfield is described to have a size of 3-bit in the embodiments described above, the above-described embodiments may be applied to a case in which the TWT Flow ID subfield has a size of 4-bit.

As described above, a single TWT element may request a TWT agreement through multiple links. Accordingly, it is necessary to additionally transmit required information. A description thereof will be given with reference to FIG. 22.

FIG. 22 illustrates a format of a Control field included in a TWT element transmitted by a multi-link device according to an embodiment of the disclosure.

Additional information required when a single TWT element requests a TWT agreement through multiple links may include the link ID bitmap corresponding to information indicating a link on which the TWT agreement is performed and the Additional TWT Flow Identifier field which is the TWT Flow ID corresponding to the TWT agreement. However, in case that the station of the multi-link device transmits the TWT request frame to a station associated to the station, the TWT element included in the TWT request frame may not include the additional information. The TWT element may include a field indicating whether the Link ID Bitmap field and the Additional TWT Flow Identifier field are included. The station having received the TWT element may determine a format of the TWT element on the basis of the field indicating whether the Link ID Bitmap field and the Additional TWT Flow Identifier field are included.

In case that the TWT element transmitted by the TWT request station includes the Link ID Bitmap subfield, the TWT request station may set a link ID bitmap present subfield of a Control field of the TWT element to have a value of 1. In case that the link ID bitmap present subfield of the Control field of the TWT element has a value of 1, the TWT response station having received the TWT element may determine that the TWT element includes the Link ID Bitmap subfield and the TWT element is for establishing a TWT agreement in multiple links or a link other than the link through which the TWT request frame including the TWT element is transmitted.

In case that the TWT element transmitted by the TWT request station includes the Additional TWT Flow ID subfield, the TWT request station may set an Additional TWT Flow ID present subfield of the Control field of the TWT element to have a value of 1. In case that the Additional TWT Flow ID present subfield of the Control field of the TWT element has a value of 1, the TWT response station having received the TWT element may determine that the TWT element includes the Additional TWT Flow ID subfield and the TWT element is for establishing a TWT agreement in multiple links.

In another specific embodiment, the Additional TWT Flow ID present subfield may be omitted. Here, the TWT response station having received the TWT element may determine whether the TWT element includes the Additional TWT Flow ID subfield on the basis of the Link ID Bitmap subfield. In addition, the TWT response station having received the TWT element may determine a size of the Additional TWT Flow ID subfield included in the TWT element on the basis of the Link ID Bitmap subfield.

As described above, the multi-link device may transmit the TWT teardown frame for tearing down the TWT agreement applied to the second link through the first link. In addition, the multi-link device may tear down the TWT agreement applied to multiple links by transmitting the TWT teardown frame through a single link.

The TWT teardown frame may include additional information in a TWT teardown frame of the conventional wireless LAN. A description thereof will be given with reference to FIG. 23.

FIG. 23 illustrates a format of an Action field of a TWT teardown frame transmitted by a multi-link device according to an embodiment of the disclosure.

The TWT teardown frame transmitted by the multi-link device may be defined as a new action frame. For convenience of the description, the TWT teardown frame transmitted by the multi-link device is referred to as an MLD TWT teardown frame. The MLD TWT teardown frame may be designated as Unprotected S1G among the categories in the Action field. Among values of the Action field of Unprotected S1G, a value not used in the conventional wireless LAN may be allocated to the MLD TWT teardown frame. For example, as shown in the embodiment of (a) of FIG. 23, "12" may be allocated to the MLD TWT teardown frame. Here, in case that a station attempts to transmit the MLD TWT teardown frame, the station may set a category to have a value of 22 in the action frame and set the unprotected S1G Action field to have a value of 12.

In addition, the Action field of the MLD TWT teardown frame may include a field indicating the TWT agreement which the TWT teardown frame attempts to tear down. The field may be referred to as an MLD TWT Flow field. The MLD TWT Flow field may indicate a link ID of the link corresponding to the TWT agreement which the TWT teardown frame attempts to tear down and a TWT Flow ID corresponding to the TWT agreement which the TWT teardown frame attempts to tear down. (b) of FIG. 23 illustrates an example of the Action field included in the TWT teardown frame.

The MLD TWT Flow field may be indicated by an Action field of another category in addition to the Unprotected S1G category. For example, MLD TWT teardown frame may be transmitted in a protected action frame format of the S1G category. Here, the Action field of the action frame of the S1G category may include the MLD TWT Flow field.

The TWT teardown frame may be used in a different format from that of the action frame described in this embodiment and a frame other than the action frame may be used as the TWT teardown frame. A detailed description of the format of the MLD TWT Flow field will be given with reference to FIG. 24.

FIG. 24 illustrates an MLD TWT Flow field according to an embodiment of the disclosure.

The MLD TWT Flow field may include a field having a variable length. Specifically, the MLD TWT Flow field may include a field having a variable length, which indicates the TWT Flow ID corresponding to the TWT agreement which the MLD TWT teardown frame attempts to tear down. In a specific embodiment, the MLD TWT Flow field may include an MLD TWT Flow Control field having a fixed length and an MLD TWT Flow IDs field having a variable length. The MLD TWT Flow Control field may correspond to a field of 1-octet. In addition, the MLD TWT Flow Control field may indicate information for parsing the MLD TWT Flow IDs field. Specifically, the MLD TWT Control field may indicate information for a size of the MLD TWT Flow IDs field. The MLD TWT Flow IDs field may indicate a TWT Flow ID corresponding to the TWT agreement to be torn down. In addition, depending on a configuration of the MLD TWT Flow Control field, the MLD TWT Flow IDs field may be omitted. (a) of FIG. 24 illustrates the MLD TWT Flow field according to this embodiment.

The MLD TWT Flow Control field may include a field indicating a length of the MLD TWT Flow IDs field. Here, the field may be referred to as a Length of MLD Flow IDs field. The length of the MLD flow IDs field may indicate a length of the MLD TWT Flow IDs field in units of 1 octet. Here, in case that the MLD TWT Flow IDs field has a length of 5-octet, a value of the length of the MLD flow IDs field may be set to be 5 or 4. (b) of FIG. 24 illustrates the MLD TWT Flow field according to this embodiment.

Furthermore, the TWT Flow Control field may include a subfield indicating tearing down all TWT agreement established between the multi-link device transmitting the MLD TWT teardown frame and the multi-link device receiving the MLD TWT teardown frame. This subfield is referred to as a Teardown All TWT of All Link field. In case that the multi-link device attempts to tear down all TWT agreements established between the multi-link device and a receiver of the MLD TWT teardown frame, the multi-link device may set the Teardown All TWT of All Link subfield of the MLD TWT teardown frame to have a value of 1. In case of successfully receiving the MLD TWT teardown frame having the Teardown All TWT of All Link subfield set to have a value of 1, all TWT agreements established between the multi-link device transmitting the MLD TWT teardown frame and the multi-link device receiving the MLD TWT teardown frame are torn down. In case that the Teardown All TWT of All Link subfield has a value of 1, the Length of MLD Flow IDs field may be set to be a reserved field. Accordingly, in case that the Teardown All TWT of All Link subfield has a value of 1, the MLD TWT Flow field may not include MLD TWT Flow IDs. (b) of FIG. 24 illustrates the TWT Flow Control field according to this embodiment.

The MLD TWT Flow IDs field may repeatedly include a 3-bit TWT identifier subfield, a 4-bit link ID field, and a 1-bit Teardown All TWT subfield for each octet. Here, the consecutive TWT identifier subfield and link ID field may identify the TWT agreement torn down by the MLD TWT teardown frame. (c) of FIG. 24 illustrates the MLD TWT Flow IDs field according to this embodiment.

In addition, the Teardown All TWT subfield may indicate that all TWT agreements related to the link corresponding to the Teardown All TWT subfield are torn down. Here, the link corresponding to the Teardown All TWT subfield is a link corresponding to the link ID field included in the same octet as the Teardown All TWT subfield. In addition, in case that the Teardown All TWT subfield has a value of 1, the TWT identifier subfield may be set to be a reserved field. (e) of FIG. 24 illustrates the MLD TWT Flow IDs field according to this embodiment.

In another specific embodiment, the Teardown All TWT subfield may indicate that all TWT agreements corresponding to the TWT Flow ID corresponding to the Teardown All TWT subfield are torn down. Here, the link corresponding to the Teardown All TWT subfield is a TWT Flow ID corresponding to the TWT Flow Identifier subfield included in the same octet as the Teardown All TWT subfield. In addition, in case that the Teardown All TWT subfield has a value of 1, the link ID subfield may be set to be a reserved field. (f) of FIG. 24 illustrates the MLD TWT Flow IDs field according to this embodiment.

In another specific embodiment, the MLD TWT Flow IDs field may consecutively include multiple TWT identifier subfields, consecutively include multiple link ID fields, and consecutively include multiple Teardown All TWT subfields. In this embodiment, the TWT identifier subfield and the link ID field in the same order may identify the TWT agreement torn down by the MLD TWT teardown frame. For example, a combination of a first TWT identifier subfield and a first link ID field may identify a TWT agreement torn down by the MLD TWT teardown frame, and a combination of a second TWT identifier subfield and a second link ID field may identify the TWT agreement torn down by the MLD TWT teardown frame. At least one of the number of TWT Flow Identifier subfields, the number of link ID subfields, and the number of Teardown All TWT subfields included in the MLD TWT Flow IDs field may be proportional to a size of the MLD TWT Flow IDs field. In addition, the Teardown All TWT subfields and the link ID fields may consecutively correspond to each other. For example, a first Teardown All TWT subfield may correspond to a first link ID field and a second Teardown All TWT subfield may correspond to a second link ID field. In addition, the Teardown All TWT subfields and the TWT Flow Identifier subfields may consecutively correspond to each other. For example, a first Teardown All TWT subfield may correspond to a first TWT Flow Identifier subfield and a second Teardown All TWT subfield may correspond to a second TWT Flow Identifier subfield.

In another specific embodiment, the MLD TWT teardown frame may include a link ID bitmap for indicating multiple links. This format may be identical to that of the Link ID Bitmap field included in the TWT element described above. In addition, the MLD TWT teardown frame may include a bitmap for signaling information for tearing down multiple TWT agreements. A description thereof will be given with reference to FIG. 25.

FIG. 25 illustrates a format of an MLD TWT Flow field according to another embodiment of the disclosure.

As described above, the MLD TWT teardown frame may have variable length. Here, the MLD TWT teardown frame may include an MLD TWT Flow Control field having a fixed length and an MLD TWT Bitmap field. That is, the MLD TWT teardown frame may include the MLD TWT Bitmap field instead of the MLD TWT Flow IDs field shown in the embodiments described with reference to FIG. 24. Here, the MLD TWT Flow Control field may have a length of 1 octet. In addition, the MLD TWT Bitmap field in the MLD TWT teardown frame may be omitted depending on the value of the MLD TWT Flow Control field. (a) of FIG. 25 illustrates a format of the MLD TWT Flow field according to this embodiment.

The MLD TWT Control field may include a subfield indicating information related to a size of the MLD TWT Bitmap field. The subfield is referred to as a length of bitmap subfield. The length of bitmap field may indicate a size of the MLD TWT Bitmap field in units of 3-octet. For example, in case that the MLD TWT Bitmap field has a length of 9-octet, a value of the length of bitmap field may be set to be 3 or 2. The length of bitmap subfield may be a 3-bit field. Here, the number of types of lengths the MLD TWT Bitmap field may have may be limited to eight or less. This is because the number of TWT Flow IDs is eight or less. (b) of FIG. 25 illustrates a format of the MLD TWT Control field according to this embodiment.

As described with reference to FIG. 24, the MLD TWT Flow Control field may include a subfield indicating tearing down all TWT agreement established between the multi-link device transmitting the MLD TWT teardown frame and the multi-link device receiving the MLD TWT teardown frame.

This subfield is referred to as a Teardown All TWT of All Link field. In case that the multi-link device attempts to tear down all TWT agreements established between the multi-link device and a receiver of the MLD TWT teardown frame, the multi-link device may set the Teardown All TWT of All Link subfield of the MLD TWT teardown frame to have a value of 1. In case of successfully receiving the MLD TWT teardown frame having the Teardown All TWT of All Link subfield set to have a value of 1, all TWT agreements established between the multi-link device transmitting the MLD TWT teardown frame and the multi-link device receiving the MLD TWT teardown frame are torn down. In case that the Teardown All TWT of All Link subfield has a value of 1, the Length of TWT Bitmap field may be set to be a reserved field. Accordingly, in case that the Teardown All TWT of All Link subfield has a value of 1, the MLD TWT Flow field may not include the TWT Bitmap field. (c) of FIG. 25 illustrates the TWT Flow Control field according to this embodiment.

The TWT Bitmap field may repeatedly include the TWT Flow ID bitmap subfield having a length of 1-octet and the Link ID Bitmap subfield having a length of 2-octet per 3 octets. (d) of FIG. 25 illustrates the TWT Bitmap field according to this embodiment. The TWT Flow ID bitmap subfield may indicate the TWT Flow ID corresponding to the TWT agreement which the TWT request frame attempts to tear down. In case that the MLD TWT teardown frame tears down TWT agreements having TWT Flow IDs 1 to 3, the TWT Flow ID bitmap subfield may be set to be 1110 00002b. Here, values 1 to 8 of the TWT Flow ID are mapped to first to eighth bits of the TWT Flow ID bitmap, respectively. In addition, the Link ID Bitmap subfield may indicate the link ID of the link corresponding to the TWT agreement which the TWT request frame attempts to tear down. In case that the MLD TWT teardown frame tears down TWT agreements set to links corresponding to link IDs 1 to 3, the Link ID Bitmap subfield may be set to be 1110 00002b. Here, values 1 to 8 of the link ID are mapped to first to eighth bits of the link ID bitmap, respectively. In addition, as described above, the TWT Flow ID may be indicated by using 3 bits. Accordingly, the TWT Flow ID bitmap may indicate a single TWT Flow ID value by using a field having a size of 3-bit. In this case, 5 bits of the TWT Flow ID bitmap subfield may be a reserved field. (e) of FIG. 25 illustrates the TWT Bitmap field according to this embodiment.

In another specific embodiment, the TWT Bitmap field may consecutively include the TWT Flow ID bitmap subfield and consecutively include the Link ID Bitmap subfield. At least one of a length of the TWT Flow ID bitmap subfield and a length of the Link ID Bitmap subfield included in the TWT Bitmap field may be proportional to a size of the TWT Bitmap field.

The TWT agreement which the TWT teardown frame attempts to tear down is a TWT agreement corresponding to the TWT Flow ID indicated by the TWT Flow ID bitmap subfield and corresponding to the link ID indicated by the Link ID Bitmap subfield.

The MLD TWT teardown frame described above is a frame newly defined to tear down the TWT agreement established between multi-link devices not a TWT teardown frame used in the conventional wireless LAN. A method for tearing down a TWT agreement established between multi-link devices by using a conventional TWT teardown frame will be described. Specifically, 1) a method for tearing down all TWT agreements established on a link through which the TWT teardown frame is transmitted, 2) a method for tearing down all TWT agreements established on a specific link, 3) a method for tearing down a TWT agreement corresponding to a specific TWT Flow ID in all links, and 4) a method for tearing down all TWT agreements set for all links will be described.

FIG. 26 illustrates a TWT teardown frame for tearing down a TWT agreement established in a multi-link device according to an embodiment of the disclosure.

The conventional TWT teardown frame includes a TWT Flow field having a length of 1 octet. Here, a first bit to a third beat B0-B2 of the TWT Flow field are TWT Flow Identifier subfields indicating a TWT Flow ID. A fourth bit to a fifth bit B3-B4 of the TWT Flow field are reserved fields. A sixth bit to a seventh bit B5-B6 of the TWT Flow field are negotiation type subfields indicating a negotiation type. Here, the sixth bit to an eighth bit B7 of the TWT Flow field may be set as a Teardown All TWT subfield. The Teardown All TWT subfield may indicate that all TWT agreements established between a station transmitting the TWT teardown frame and a station receiving the TWT teardown frame are to be torn down. The format of the TWT Flow field described above may correspond to a case in which the negotiation type subfield has a value of 0 or 1. In case that the Teardown All TWT subfield has a value of 1, the TWT identifier subfield may be set to be a reserved field and a value of the TWT Flow Identifier subfield may be set to be 0.

First, the method for tearing down all TWT agreements established on a link through which the TWT teardown frame is transmitted will be described. To signal the tearing down of all TWT agreements established on the link through which the TWT teardown frame is transmitted, the Teardown All TWT subfield B7 of the TWT teardown frame may be set to have a value of 1 and the Teardown Type subfield B4 may be set to have a value of 0. Here, the first bit to the fourth bit B0-B3 of the TWT Flow field may be set as reserved fields. (a) of FIG. 26 illustrates a format of the TWT Flow field according to this embodiment. In case that the Teardown All TWT subfield of the TWT Flow field has a value of 1 and the Teardown Type subfield has a value of 0, a multi-link device transmitting the TWT teardown frame including the TWT Flow field and a multi-link device receiving same may tear down all TWT agreements established on a link through which the TWT teardown frame is transmitted among all TWTs established between two multi-link devices.

The method for tearing down all TWT agreements established on a specific link will be described. To signal the tearing down of all TWT agreements established on a specific link, the Teardown All TWT subfield B7 of the TWT teardown frame may be set to have a value of 0 and the Teardown Type subfield B4 may be set to have a value of 1. Here, the first bit to the fourth bit B0-B3 of the TWT Flow field may be set as link ID fields indicating a link corresponding to the TWT agreement to be torn down by the TWT teardown frame. (b) of FIG. 26 illustrates a format of the TWT Flow field according to this embodiment. In case that the Teardown All TWT subfield of the TWT Flow field has a value of 0 and the Teardown Type subfield has a value of 1, a multi-link device transmitting the TWT teardown frame including the TWT Flow field and a multi-link device receiving same may tear down all TWT agreements established on a link indicated by the link ID field.

The method for tearing down a TWT agreement corresponding to a specific flow ID in all links will be described. To signal the tearing down of a TWT agreements corresponding to a specific TWT Flow ID in all links, the Teardown All TWT subfield B7 of the TWT teardown frame may be set to have a value of 0, the Teardown Type subfield B4 may be set to have a value of 0, and an All Link subfield B3 may be set to have a value of 1. (c) of FIG. 26 illustrates a format of the TWT Flow field according to this embodiment. In case that the Teardown All TWT subfield of the TWT teardown frame has a value of 0, the Teardown Type subfield has a value of 0, and the All Link subfield has a value of 1, a multi-link device transmitting the TWT teardown frame including the TWT Flow field and a multi-link device receiving same may tear down all TWT agreements corresponding to a TWT Flow ID indicated by the TWT Flow Identifier field among TWT agreements established between the two multi-link devices.

The method for tearing down all TWT agreements set on all links will be described. To signal the tearing down of all TWT agreements set on all links, the Teardown All TWT subfield B7 of the TWT teardown frame may be set to have a value of 1 and the Teardown Type subfield B4 may be set to have a value of 1. Here, the TWT Flow field B0-B3 may be set as reserved fields. (d) of FIG. 26 illustrates a format of the TWT Flow field according to this embodiment. In case that the Teardown All TWT subfield of the TWT teardown frame has a value of 1 and the Teardown Type subfield has a value of 1, a multi-link device transmitting the TWT teardown frame including the TWT Flow field and a multi-link device receiving same may tear down a TWT agreement established between the two multi-link devices.

In the above-described embodiment, the TWT agreement is torn down by the TWT teardown frame. However, a TWT agreement may be torn down even in case that the TWT teardown frame is not transmitted or received. This is referred to as implicit tearing down. A description thereof will be given with reference to FIG. 27.

Figure 27:
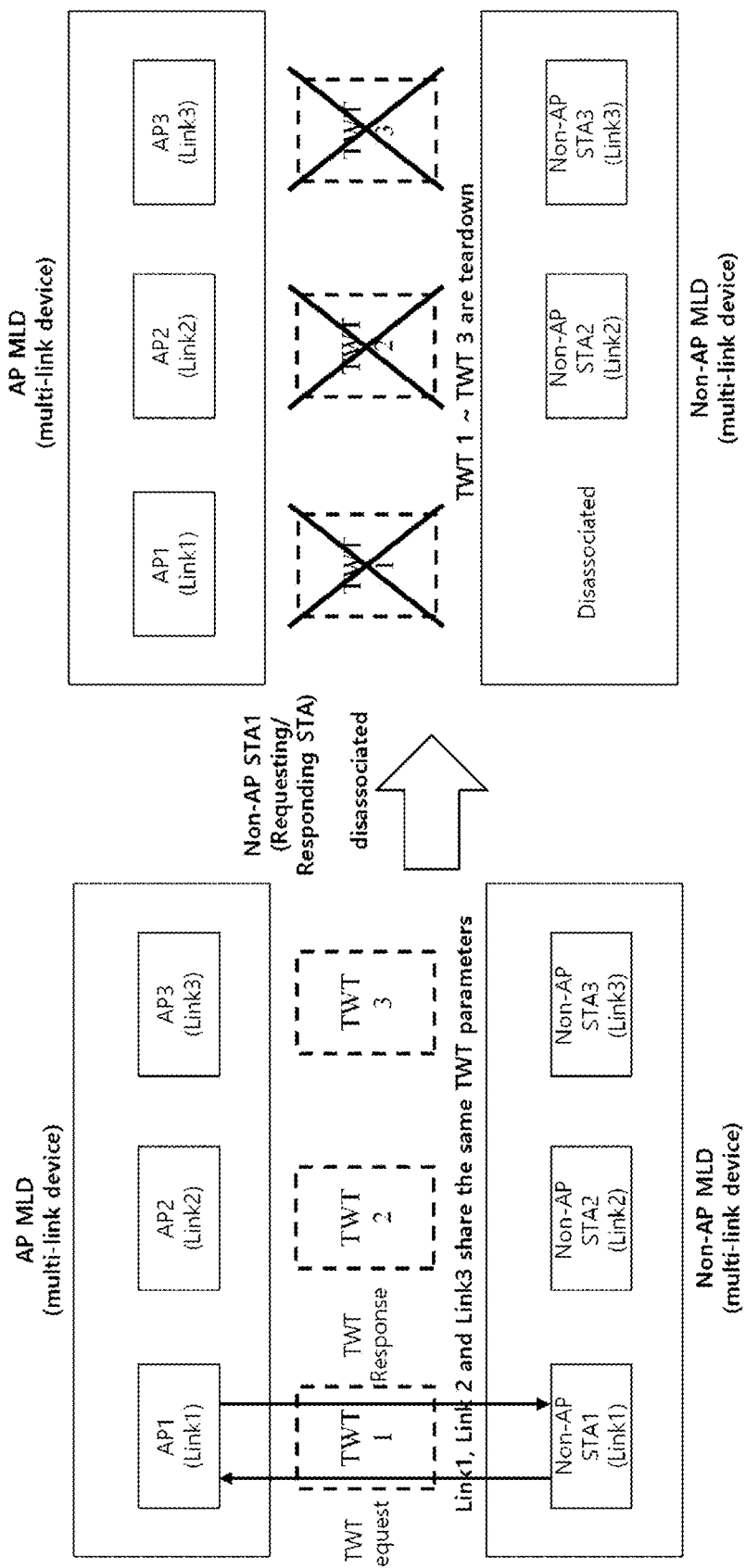
FIG. 27 illustrates an implicit teardown of a TWT agreement established in a multi-link device according to an embodiment of the disclosure.

FIG. 27 illustrates an implicit teardown of a TWT agreement established in a multi-link device according to an embodiment of the disclosure.

In case that an AP and a non-AP station is disassociated, a TWT agreement established between the AP and the non-AP station may be implicitly torn down. In addition, in case that a link in which the association of an AP and a non-AP station is performed is disabled, a TWT agreement established between the AP and the non-AP station may be implicitly torn down. Here, disabling the link may include losing a TID mapped to the link. In the following description, for convenience of description, a case where the association between an AP and a non-AP station is disassociated will be explained as an example, but the following description may also be applied to a case where a link in which association of an AP and a non-AP station is performed is disabled.

As described above, TWT agreements may be established on multiple links through a single TWT element. Here, TWT Flow IDs of the TWT agreements established on the multiple links may be the same. In addition, request stations for the TWT agreements established on the multiple links may be the same, and response stations for the TWT agreements established on the multiple links may be the same. Accordingly, TWT agreements established in multiple links are difficult to be distinguished from each other, and when tearing down TWT agreements, the TWT agreements may have to be torn down simultaneously. In addition, in case that an AP and a non-AP station are disassociated in the conventional wireless LAN standard, the AP and the non-AP station implicitly tear down a TWT agreement established between the AP and the non-AP station. Here, the AP and the non-AP station delete information for the TWT agreement established therebetween.

In case that TWT agreements are established on multiple links through a single TWT element, TWT Flow IDs of the TWT agreements established on the multiple links are the same, and a TWT request station and a TWT response station are disassociated, all the multiple TWT agreements may be implicitly torn down.

In another specific embodiment, in case that a first station corresponding to a station included in a multi-link device is disassociated from a second station associated to the first station, a TWT agreement in which the first station corresponds to a TWT response station or the first station corresponds to a TWT request station may be implicitly torn down. Here, the first station operates on a first link. The TWT agreement to be torn down may be inherited to a station operating in a link other than the first link among links on which the multi-link device including the first station operates. Here, signaling including a link ID may be performed for the succession of the TWT agreement. In addition, the signaling for the succession of the TWT agreement may be transmitted through a management frame. In addition, the succession of the TWT agreement may be also applied to a case in which one station is not associated to a station associated to a station. In case that the succession of the TWT agreement is performed, a TWT agreement having been established before the succession may be torn down. In the above-described embodiments, the succession of the TWT agreement may indicate that a TWT parameter applied to a previously established TWT agreement is applied to a new TWT agreement.

In the embodiment of FIG. 27, a non-AP multi-link device non-AP MLD includes a first station STA1, a second station STA2, and a third station STA3. The first station STA1, the second station STA2, and the third station STA3 operate in a first link Link1, a second link Link2, and a third link Link3, respectively. An AP multi-link device AP MLD includes a first AP AP1, a second AP AP2, and a third AP AP3. The first AP AP1, the second AP AP2, and the third AP AP3 operate in the first link Link1, the second link Link2, and the third link Link3, respectively. The first station STA1 and the first AP AP1 are associated to each other and establish TWT agreements TWT 1, TWT 2, and TWT 3 on the first link Link1, the second link Link2, and the third link Link3. A request station and a response station of the TWT agreements TWT 1, TWT 2, and TWT 3 on the first link Link1, the second link Link2, and the third link Link3 are the first station STA1 and the first AP AP1. The non-AP multi-link device non-AP MLD and the AP multi-link device AP MLD perform a reassociation procedure so that the first station STA1 and the first AP AP1 may be disassociated. All the TWT agreements in which the first station STA1 and the first AP AP1 correspond to a TWT response station or a TWT request station may be implicitly torn down. Accordingly, all the TWT agreements TWT 1, TWT 2, and TWT 3 on the first link Link1, the second link Link2, and the third link Link3 are torn down.

Through reassociation, the first station STA1 may be associated with a fourth AP AP4 which is an AP different from the first AP AP1 of the AP multi-link device AP MLD so as to operate on another link. Here, the TWT agreement between the first station STA1 and the first AP AP1 may be inherited to the first station STA1 and the fourth AP AP4. As such, regardless of the link in which an initial TWT setting is performed, a TWT agreement may be set on a new link through the succession of the TWT agreement.

Although the disclosure has been described using wireless LAN communication as an example as described above, the disclosure is not limited thereto and may be equally applied to other communication systems such as cellular communication. Furthermore, although the methods, devices, and systems of the disclosure have been described with respect to specific embodiments, some or all of the components and operations of the disclosure may be implemented using computer systems having a general-purpose hardware architecture.

The features, structures, effects, and the like described in the embodiments above are included in at least one embodiment of the disclosure and are not necessarily limited to only one embodiment. Furthermore, the features, structures, effects, and the like illustrated in each embodiment may be combined or modified to be implemented in other embodiments by a person skilled in the art to which the embodiments belong. Accordingly, such combinations and modifications are to be construed as being within the scope of the disclosure.

Although the above description is made based on the embodiments, this is only an example and does not limit the disclosure, and those skilled in the art to which the invention belongs will recognize that various modifications and applications not illustrated herein are possible without departing from the essential features of the disclosure. For example, each of the components specifically shown in the embodiments may be practiced with variations. Furthermore, such variations and differences in application are to be construed as falling within the scope of the disclosure as defined by the appended claims.

The invention claimed is:

1. A multi-link device including a first station and a second station operating in a first link and a second link, respectively, the multi-link device comprising:
   a transceiver; and
   a processor,
   wherein the processor is configured to transmit a target wake time (TWT) element from the first station associated with a first AP on the first link, so as to request a TWT agreement for the second station and a second AP associated with the second station,
   when the second link is disabled, tear down the TWT agreement for the second station and the second AP without reception or transmission of a TWT teardown frame for tearing down the TWT agreement for the second station and the second AP.

2. The device of claim 1, wherein the TWT element comprises a bitmap indicating information indicating the second link to which the TWT agreement to be established by the TWT element is to be applied.

3. The device of claim 1, wherein a TWT request station of the TWT agreement for the second station and the second AP is the second station, and
   a TWT response station of the TWT agreement for the second station and the second AP is the second AP.

4. The device of claim 3, wherein the processor is configured to, when receiving the TWT teardown frame from the second AP or transmitting the TWT teardown frame to the second AP successfully, tear down the TWT agreement for the second station and the second AP.

5. The device of claim 1, wherein when the multi-link device receives the TWT teardown frame from the first AP or transmitting the TWT teardown frame to the first AP successfully, tear down the TWT agreement for the second station and the second AP,
   the TWT agreement is identified in the TWT teardown frame based on a link identifier (ID) of the second link, a medium access control (MAC) address of a TWT requesting station and a MAC address of a TWT responding station of the TWT agreement, and a TWT Flow ID of the TWT agreement, and
   the TWT requesting station of the TWT agreement for the second station and the second AP is the second station, and the TWT responding station of the TWT agreement for the second station and the second AP is the second AP.

6. The device of claim 1, wherein the processor is configured to:
   tear down the TWT agreement for the second station and the second AP; and
   inherit the TWT agreement for the second station and the second AP to the first station and the first AP.

7. The device of claim 6, wherein the processor is configured to, when inheriting the TWT agreement for the second station and the second AP to the first station and the first AP, apply a TWT parameter of the TWT agreement for the second station and the second AP to a TWT agreement for the first station and the first AP.

8. A method of operating a multi-link device including a first station and a second station operating on a first link and a second link, respectively, the method comprising transmitting a target wake time (TWT) element from a first station associated with a first AP in a first link, so as to request a TWT agreement for a second station, and a second AP associated with the second station,
   determining that the second link is disabled, and tearing down, based on the determination, the TWT agreement for the second station and the second AP without reception or transmission of a TWT teardown frame for tearing down the TWT agreement for the second station and the second AP.

9. The method of claim 8, wherein the TWT element comprises a bitmap indicating information indicating the second link to which the TWT agreement to be established by the TWT element is to be applied.

10. The method of claim 8, wherein a TWT request station of the TWT agreement for the second station and the second AP is the second station, and
    a TWT response station of the TWT agreement for the second station and the second AP is the second AP.

11. The method of claim 10, further comprising, when receiving the TWT teardown frame from the second AP or transmitting the TWT teardown frame to the second AP successfully, tearing down the TWT agreement for the second station and the second AP.

12. The method of claim 8, wherein when the multi-link device receives the TWT teardown frame from the first AP or transmitting the TWT teardown frame to the first AP successfully, tear down the TWT agreement for the second station and the second AP,
    the TWT agreement is identified in the TWT teardown frame based on a link identifier (ID) of the second link, a medium access control (MAC) address of a TWT requesting station and a MAC address of a TWT responding station of the TWT agreement, and a TWT Flow ID of the TWT agreement, and
    the TWT requesting station of the TWT agreement for the second station and the second AP is the second station, and the TWT responding station of the TWT agreement for the second station and the second AP is the second AP.

* * * * *